(12) United States Patent
Fuchs et al.

(10) Patent No.: US 6,373,825 B1
(45) Date of Patent: Apr. 16, 2002

(54) TELECOMMUNICATION NETWORK AND STATE PROPAGATION METHOD

(75) Inventors: Karl Fuchs, Furth; Jean-Michel Traynard, Munich, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/140,733

(22) Filed: Aug. 27, 1998

(30) Foreign Application Priority Data

Aug. 28, 1997 (EP) .............................................. 97114935

(51) Int. Cl.[7] .............................................. H04L 12/28
(52) U.S. Cl. ...................... 370/255; 370/254; 370/259
(58) Field of Search ................................. 370/254, 255, 370/256, 259, 351, 353, 354, 396, 466; 376/112, 230; 709/203, 223; 455/12.1

(56) References Cited

U.S. PATENT DOCUMENTS

| | | | |
|---|---|---|---|
| 5,127,006 A | | 6/1992 | Subramanian et al. |
| 5,408,218 A | | 4/1995 | Svedberg et al. |
| 5,526,415 A | * | 6/1996 | Wakamoto ................. 379/230 |
| 5,655,071 A | | 8/1997 | Habbe et al. |
| 5,696,697 A | * | 12/1997 | Blau et al. ................... 379/112 |
| 5,812,533 A | * | 9/1998 | Cox et al. .................... 370/259 |
| 5,825,772 A | * | 10/1998 | Dobbins et al. ............ 370/396 |
| 5,996,009 A | * | 11/1999 | Kitamura et al. ........... 709/223 |
| 6,041,350 A | * | 3/2000 | Takimoto ..................... 709/223 |
| 6,055,243 A | * | 4/2000 | Vincent et al. ............. 370/466 |
| 6,098,094 A | * | 8/2000 | Barnhouse et al. ......... 709/203 |
| 6,157,636 A | * | 12/2000 | Voit et al. ................... 370/353 |
| 6,157,648 A | * | 12/2000 | Voit et al. ................... 370/354 |
| 6,160,988 A | * | 12/2000 | Shroyer ..................... 455/12.1 |

OTHER PUBLICATIONS

Management (Operation & Maintenance) von GSM Base Station Subsystemen, Schmidt, Stephan, Alcatel SEL, Stuttgart—p. 445–456.
8439 IEEE Personal Communications 1 (1994) 4th, Quarter, No. 4, New York, NY US, An Overview of T1M1 efforts in standards development, A Standard for the OAM&P of PCS Systems.

* cited by examiner

*Primary Examiner*—Salvatore Cangialosi
(74) *Attorney, Agent, or Firm*—Schiff Hardin & Waite

(57) ABSTRACT

A telecommunication network has an operation and maintenance device and a plurality of network elements each of them having hardware objects. At least one network element communicates state changes to the operation and maintenance device. The operation and maintenance device has a memory device and a processing device. The memory device stores a state dependency graph with objects, states of the objects and operators and a set of rules allocated to the operators. The processing device processes the communicated state changes by applying the rules to the operators of the graph and calculates the new states of all objects that depend on the communicated state change.

20 Claims, 33 Drawing Sheets

FIG 3

| State/Status attribute | Values | Notes |
|---|---|---|
| AST (single-valued) | unlocked (unl) | |
| | locked (loc) | |
| | shut down (shu) | only for FMOs |
| OST (single-valued) | enabled (ena) | |
| | disabled (dis) | |
| AVS (set-valued) | failed (fail) | only for HMOs |
| | in test (tst) | only for HMOs |
| | power off (pof) | only for processor equipped HMOs |
| | off line (ofl) | only for FMOs |
| | not installed (noi) | only for HMOs |
| | dependency (dep) | only for processor equipped HMOs and FMOs |
| | degraded (deg) | only for FMOs |
| | off duty (ofd) | only for HMOs |
| | empty set (∅) | |
| PRS (set-valued) | initializing (ini) | |
| | terminating (ter) | only for FMOs |
| | empty set (∅) | |

FIG 5

| internal state | description | set by an external event | set by the propagation algorithm |
|---|---|---|---|
| OK | MO is fault-free, i.e., it provides full service. | yes | |
| FW | MO is degraded (weak fault), but provides service (only possible for FMOs). | | yes |
| DF | MO is fault free and inactive because it is functional dependent on a set of other faulty MOs. The MO provides no service. | | yes |
| DFW | MO is degraded and inactive because it is functional dependent on a set of other faulty MOs. The MO provides no service (only possible for FMOs). | | yes |
| FN | MO has a transient fault, i.e., it is transient out of service. | yes | yes |
| FDN | MO is transient out of service since another MO, on which this MO physically depends on, has a transient fault. | | yes |
| FT | MO is transient out of service because of an intrusive test. This state does not cause a physical dependency. | yes | |
| FL | MO is permanent out of service due to an operator request. This state does not cause a physical dependency. | yes | |
| FH | MO has a hard fault <u>or was switched to power off</u> and, consequently, is permanent out of service. | yes | yes |
| FDH | MO is permanent out of service since another MO, on which this MO physically depends on, has a permanent fault. | | yes |
| NC | MO is not created. | yes | |
| NV | neutral state; required for the simultaneous treatment of different configurations. | | |

FIG 6A

| external state $s_e$ | internal state $s_i$ |
|---|---|
| (unl, ena, nul, nul) | OK |
| (unl, ena, ofd, nul) | DF |
| (loc, ena, nul, nul) | FL |
| (loc, ena, ofd, nul) | FL |
| (unl, dis, nul, nul) | FN |
| (loc, dis, nul, nul) | FH |
| (unl, dis, nul, nul_alig) | FH |
| (loc, dis, nul, nul_alig) | FH |
| (unl, dis, nul, ini) | FN |
| (loc, dis, nul, ini) | FH |
| (unl, dis, nul, ini_dl) | FN |
| (loc, dis, nul, ini_dl) | FH |
| (unl, dis, dep, nul) | FDN |
| (loc, dis, dep, nul) | FDH |
| (unl, dis, tst, nul) | FT |
| (loc, dis, tst, nul) | FL |

FIG 6B

| external state $s_e$ | internal state $s_i$ |
|---|---|
| (unl, dis, noi, nul) | FH |
| (loc, dis, noi, nul) | FH |
| (unl, dis, pof, nul) | FH |
| (loc, dis, pof, nul) | FH |
| (unl, dis, fai, nul) | FH |
| (loc, dis, fai, nul) | FH |
| (unl, dis, {fai,tst}, nul) | FH |
| (loc, dis, {fai,tst}, nul) | FH |
| (unl, dis, {fai,tst}, nul_tst) | FH |
| (loc, dis, {fai,tst}, nul_tst) | FH |
| (unl, dis, {fai,tst}, ini) | FH |
| (loc, dis, {fai,tst}, ini) | FH |
| (unl, dis, {fai,tst}, ini_dl) | FH |
| (loc, dis, {fai,tst}, ini_dl) | FH |
| (unl, dis, {fai,pof}, nul) | FH |
| (loc, dis, {fai,pof}, nul) | FH |
| (NO_AST, NO_OST, NO_AVS, NO_PRS)[a] | NC | a. This state is used for a not created HMO.

FIG 7A

| old external state (AST, OST, AVS, PRS) | actual internal state | new external state (AST, OST, AVS, PRS) | comment |
|---|---|---|---|
| no external state change | | | |
| (unl, ena, nul, nul) | OK | (unl, ena, nul, nul) | |
| (unl, ena, ofd, nul) | DF | (unl, ena, ofd, nul) | |
| (loc, ena, ofd, nul) | FL | (loc, ena, ofd, nul) | |
| (unl, dis, nul, nul) | FN | (unl, dis, nul, nul) | |
| (loc, dis, nul, nul) | FH | (loc, dis, nul, nul) | |
| (unl, dis, nul, nul_alig) | FH | (unl, dis, nul, nul_alig) | |
| (loc, dis, nul, nul_alig) | FH | (loc, dis, nul, nul_alig) | |
| (unl, dis, nul, ini) | FN | (unl, dis, nul, ini) | |
| (loc, dis, nul, ini) | FH | (loc, dis, nul, ini) | |
| (unl, dis, nul, ini_dl) | FN | (unl, dis, nul, ini_dl) | |
| (loc, dis, nul, ini_dl) | FH | (loc, dis, nul, ini_dl) | |

FIG 7B

| old external state (AST, OST, AVS, PRS) | actual internal state | new external state (AST, OST, AVS, PRS) | comment |
|---|---|---|---|
| no external state change | | | |
| (unl, dis, dep, nul) | FDN | (unl, dis, dep, nul) | |
| (loc, dis, dep, nul) | FDH | (loc, dis, dep, nul) | |
| (unl, dis, tst, nul) | FT | (unl, dis, tst, nul) | |
| (loc, dis, tst, nul) | FL | (loc, dis, tst, nul) | |
| (unl, dis, noi, nul) | FH | (unl, dis, noi, nul) | |
| (loc, dis, noi, nul) | FH | (loc, dis, noi, nul) | |
| (unl, dis, noi, nul) | FDH | (unl, dis, noi, nul) | |
| (loc, dis, noi, nul) | FDH | (loc, dis, noi, nul) | |
| (unl, dis, pof, nul) | FH | (unl, dis, pof, nul) | |
| (loc, dis, pof, nul) | FH | (loc, dis, pof, nul) | |
| (unl, dis, pof, nul) | FDH | (unl, dis, pof, nul) | |
| (loc, dis, pof, nul) | FDH | (loc, dis, pof, nul) | |

FIG 7C

| old external state (AST, OST, AVS, PRS) | actual internal state | new external state (AST, OST, AVS, PRS) | comment |
|---|---|---|---|
| no external state change | | | |
| (unl, dis, fai, nul) | FH | (unl, dis, fai, nul) | |
| (loc, dis, fai, nul) | FH | (loc, dis, fai, nul) | |
| (unl, dis, fai, nul) | FDH | (unl, dis, fai, nul) | |
| (loc, dis, fai, nul) | FDH | (loc, dis, fai, nul) | |
| (unl, dis, {fai,tst}, *) | FH | (unl, dis, {fai,tst}, *) | |
| (loc, dis, {fai,tst}, *) | FH | (loc, dis, {fai,tst}, *) | |
| (unl, dis, {fai,tst}, *) | FDH | (unl, dis, {fai,tst}, *) | |
| (loc, dis, {fai,tst}, *) | FDH | (loc, dis, {fai,tst}, *) | |
| (unl, dis, {fai,pof}, nul) | FH | (unl, dis, {fai,pof}, nul) | |
| (loc, dis, {fai,pof}, nul) | FH | (loc, dis, {fai,pof}, nul) | |
| (unl, dis, {fai,pof}, nul) | FDH | (unl, dis, {fai,pof}, nul) | |
| (loc, dis, {fai,pof}, nul) | FDH | (loc, dis, {fai,pof}, nul) | |

* for PRS ∈ {nul,nul_tst, ini, ini_dl}

FIG 7D

| old external state (AST, OST, AVS, PRS) | actual internal state | new external state (AST, OST, AVS, PRS) | comment |
|---|---|---|---|
| external state change | | | |
| (unl, ena, nul, nul) | DF | (unl, ena, ofd, nul) | set inactive state |
| (unl, ena, ofd, nul) | OK | (unl, ena, nul, nul) | reset inactive state |
| (loc, ena, nul, nul) | FL | (loc, ena, ofd, nul) | set inactive state |
| (unl, ena, nul, nul) | FDN | (unl, dis, dep, nul) | set physical dependent state |
| (unl, ena, ofd, nul) | FDN | (unl, dis, dep, nul) | set physical dependent state |
| (loc, ena, ofd, nul) | FDH | (loc, dis, dep, nul) | set physical dependent state |
| (unl, dis, nul, nul) | FDN | (unl, dis, dep, nul) | set physical dependent state |
| (loc, dis, nul, nul) | FDH | (loc, dis, dep, nul) | set physical dependent state |
| (unl, dis, nul, ini) | FDN | (unl, dis, dep, nul) | set physical dependent state |
| (loc, dis, nul, ini) | FDH | (loc, dis, dep, nul) | set physical dependent state |

FIG 7E

| old external state (AST, OST, AVS, PRS) | actual internal state | new external state (AST, OST, AVS, PRS) | comment |
|---|---|---|---|
| external state change | | | |
| (unl, dis, nul, ini_dl) | FDN | (unl, dis, dep, nul) | set physical dependent state |
| (loc, dis, nul, ini_dl) | FDH | (loc, dis, dep, nul) | set physical dependent state |
| (unl, dis, tst, nul) | FDN | (unl, dis, dep, nul) | set physical dependent state |
| (loc, dis, tst, nul) | FDH | (loc, dis, dep, nul) | set physical dependent state |
| (unl, dis, dep, nul) | FN | (unl, dis, nul, nul) | reset physical dependent state |
| (loc, dis, dep, nul) | FH | (loc, dis, nul, nul) | reset physical dependent state |

FIG 8

| actual internal state | new external state (OST, AVS) of BTSM |
|---|---|
| OK | (ena, nul) |
| FN | (dis, dep) |
| FT | (dis, dep) |
| FL | (dis, dep) |
| FH | (dis, dep) |

FIG 9

| actual internal state | new external state (OST, AVS) of BTS |
|---|---|
| OK | (ena, nul) |
| DF | (dis, nul) |
| FW | (ena, deg) |
| FN | (dis, dep) |
| FH | (dis, dep) |

FIG 10

| actual internal state | new external state (OST, AVS) of TRX |
|---|---|
| OK | (ena, nul) |
| DF | (dis, nul) |
| FW | (ena, deg) |
| FN | (dis, nul) |
| FH | (dis, dep) |

| antenna diversity | cascaded RXMUCOs | state of RXAMOD 0 (2,4) and RXMUCO 0 (2,4) | state of RXAMOD 1 (3,5) and RXMUCO 1 (3,5) | state of RXMUCO 6 | state of RXMUCO 7 |
|---|---|---|---|---|---|
| no | no | arbitrary state | NC | NC | NC |
| no | yes | arbitrary state | NC | arbitrary state | NC |
| yes | no | arbitrary state | arbitrary state | NC | NC |
| yes | yes | arbitrary state | arbitrary state | arbitrary state | arbitrary state |

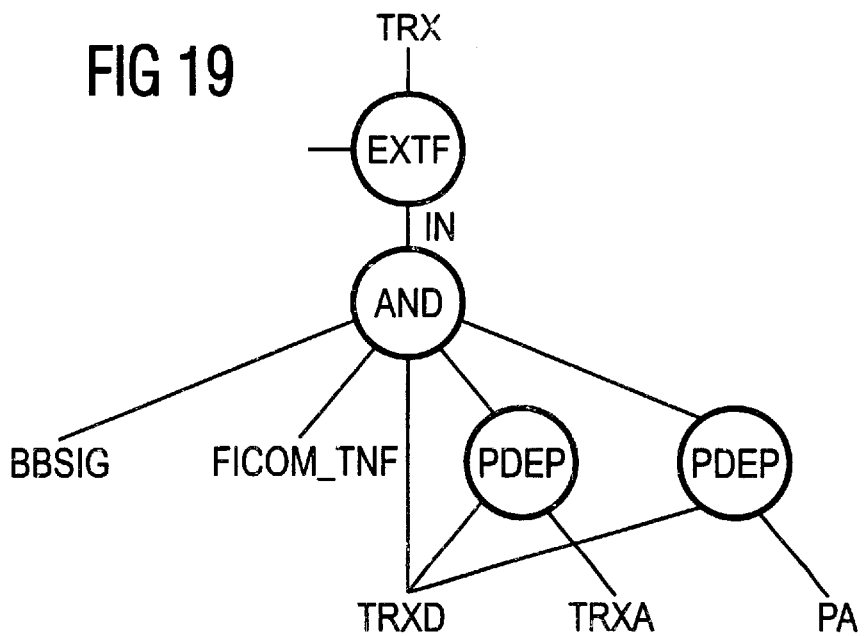
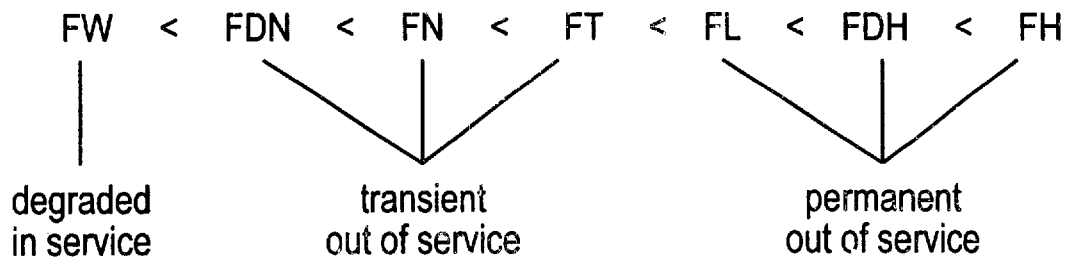

FIG 22

| AND | OK | FW | DFW | DF | FDN | FN | FT | FL | FDH | FH | NC | NV |
|-----|-----|-----|-----|-----|-----|-----|-----|-----|-----|-----|-----|-----|
| OK | OK | FW | FW | OK | FN | FN | FT | FL | FH | FH | FH | OK |
| FW | FW | FW | FW | FW | FN | FN | FT | FL | FH | FH | FH | FW |
| DFW | FW | FW | DFW | DFW | FN | FN | FT | FL | FH | FH | FH | DFW |
| DF | OK | FW | DFW | DF | FN | FN | FT | FL | FH | FH | FH | DF |
| FDN | FN | FN | FN | FN | FN | FN | FT | FL | FH | FH | FH | FN |
| FN | FN | FN | FN | FN | FN | FT | FL | FH | FH | FH | FH | FN |
| FT | FT | FT | FT | FT | FT | FL | FL | FH | FH | FH | FH | FT |
| FL | FL | FL | FL | FL | FL | FL | FL | FL | FL | FH | FH | FL |
| FDH | FH | FH | FH | FH | FH | FH | FH | FH | FH | FH | FH | FH |
| FH | FH | FH | FH | FH | FH | FH | FH | FH | FH | FH | FH | FH |
| NC | FH | FH | FH | FH | FH | FH | FH | FH | FH | FH | NC | NC |
| NV | OK | FW | DFW | DF | FN | FN | FT | FL | FH | FH | NC | NV |

FIG 25

| ANDp | OK | FW | DFW | DF | FDN | FN | FT | FL | FDH | FH | NC | NV |
|------|----|----|-----|----|-----|----|----|----|-----|----|----|----|
| OK | OK | FW | DFW | DF | FN | FN | FT | FL | FH | FH | NC | NV |
| FW | FW | FW | DFW | DF | FN | FN | FT | FL | FH | FH | NC | NC |
| DFW | DFW | DFW | DFW | DF | FN | FN | FT | FL | FH | FH | NC | FH |
| DF | DF | DF | DF | DF | FN | FN | FT | FL | FH | FH | NC | FL |
| FDN | FN | FN | FN | FN | FN | FN | FT | FL | FH | FH | NC | FT |
| FN | FN | FN | FN | FN | FN | FN | FT | FL | FH | FH | NC | FN |
| FT | FT | FT | FT | FT | FT | FT | FT | FL | FH | FH | NC | FN |
| FL | FL | FL | FL | FL | FL | FL | FL | FL | FH | FH | NC | DF |
| FDH | FH | FH | FH | FH | FH | FH | FH | FH | FH | FH | NC | DFW |
| FH | FH | FH | FH | FH | FH | FH | FH | FH | FH | FH | NC | FW |
| NC | NC | NC | NC | NC | NC | NC | NC | NC | NC | NC | NC | OK |
| NV | NV | NC | FH | FL | FT | FN | FN | DF | DFW | FW | OK | NV | priority input $i_1$ (rows), $i_2$ (columns)

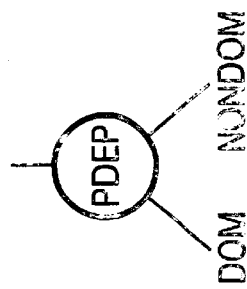

FIG 26

PDEP with outputs DOM and NONDOM

FIG 27

| PDEP | OK | FW | DFW | DF | FDN | FN | FT | FL | FH | NC | NV |
|------|-----|-----|-----|-----|-----|-----|-----|-----|-----|-----|-----|
| OK | OK | FW | DFW | DF | FDN | FN | FT | FL | FDH | FH | NC | NV |
| FW | OK | FW | DFW | DF | FN | FN | FT | FL | FDH | FH | NC | OK |
| DFW | OK | FW | DFW | DF | FDN | FN | FT | FL | FDH | FH | NC | FW |
| DF | OK | FW | DFW | DF | FDN | FN | FT | FL | FDH | FH | NC | DFW |
| FDN | FDN | FW | DFW | DF | FDN | FDN | FDN | FDH | FDH | FH | NC | DF |
| FN | FDN | FW | DFW | DF | FN | FDN | FT | FDH | FDH | FH | NC | FDN |
| FT | OK | FW | DFW | DF | FDN | FN | FT | FL | FDH | FH | NC | FN |
| FL | OK | FW | DFW | DF | FN | FN | FT | FL | FH | FH | NC | FT |
| FDH | FDH | FW | DFW | FDH | FDH | FDH | FDH | FDH | FDH | FDH | NC | FL |
| FH | FDH | FW | DFW | FDH | FDH | FDH | FDH | FDH | FDH | FDH | NC | FDH |
| NC | FDH | FW | DFW | FDH | FDH | FDH | FDH | FDH | FDH | FDH | NC | FH |
| NV | OK | FW | DFW | DF | FDN | FN | FT | FL | FDH | FH | NC | NC |
|    |    |    |    |    |    |    |    |    |    |    |    | NV |

*id* / *ind*

|  | A | 01 | 02 | M | IN |
|---|---|---|---|---|---|
| BSTM-BTS graph | OMO BTSM | NV | NV | pseudo input indicating the mapping of FMO BTS to OMO BTS | IMO IN of BTS graph |
| BTS-TRX graph | OMO BTS | HMO RXMUCO of receive path I (primary or secondary) | HMO RXMUCO of receive path II (primary or secondary) | pseudo input indicating the mapping of FMO TRX to OMO TRX | IMO IN of TRX graph |

FIG 30

| INT | OK | FW | DFW | DF | FDN | FN | FL | FT | FDH | FH | NC | NV | G | F | Sj |
|---|---|---|---|---|---|---|---|---|---|---|---|---|---|---|---|
| OK | OK | ·a | · | · | · | · | · | · | · | · | · | · | OK | · | OK |
| FW | · | FW | DFW | · | · | · | · | · | · | · | · | · | FW | · | FW |
| DFW | · | DFW | DFW | · | · | · | · | · | · | · | · | · | · | DFW | DFW |
| DF | · | · | · | DF | · | · | · | · | · | · | · | · | · | DF | DF |
| FDN | · | · | · | · | FDN | · | · | · | · | · | · | · | · | FDN | FDN |
| FN | · | · | · | · | · | FN | · | · | · | · | · | · | · | FN | FN |
| FL | · | · | · | · | · | · | FL | · | · | · | · | · | · | FL | FL |
| FT | · | · | · | · | · | · | · | FT | · | · | · | · | · | FT | FT |
| FDH | · | · | · | · | · | · | · | · | FDH | · | · | · | · | FDH | FDH |
| FH | · | · | · | · | · | · | · | · | · | FH | · | · | · | FH | FH |
| NC | · | · | · | · | · | · | · | · | · | · | NC | · | · | · | NC |
| NV | · | · | · | · | · | · | · | · | · | · | · | NV | · | · | NV |
| G | OK | FW | · | · | · | · | · | · | · | · | · | · | G | · | G |
| F | · | · | DFW | DF | FDN | FN | FL | FT | FDH | FH | · | · | · | F | F |
| Sj | OK | FW | DFW | DF | FDN | FN | FL | FT | FDH | FH | NC | NV | G | F | Sj |

· indicates an empty intersection state

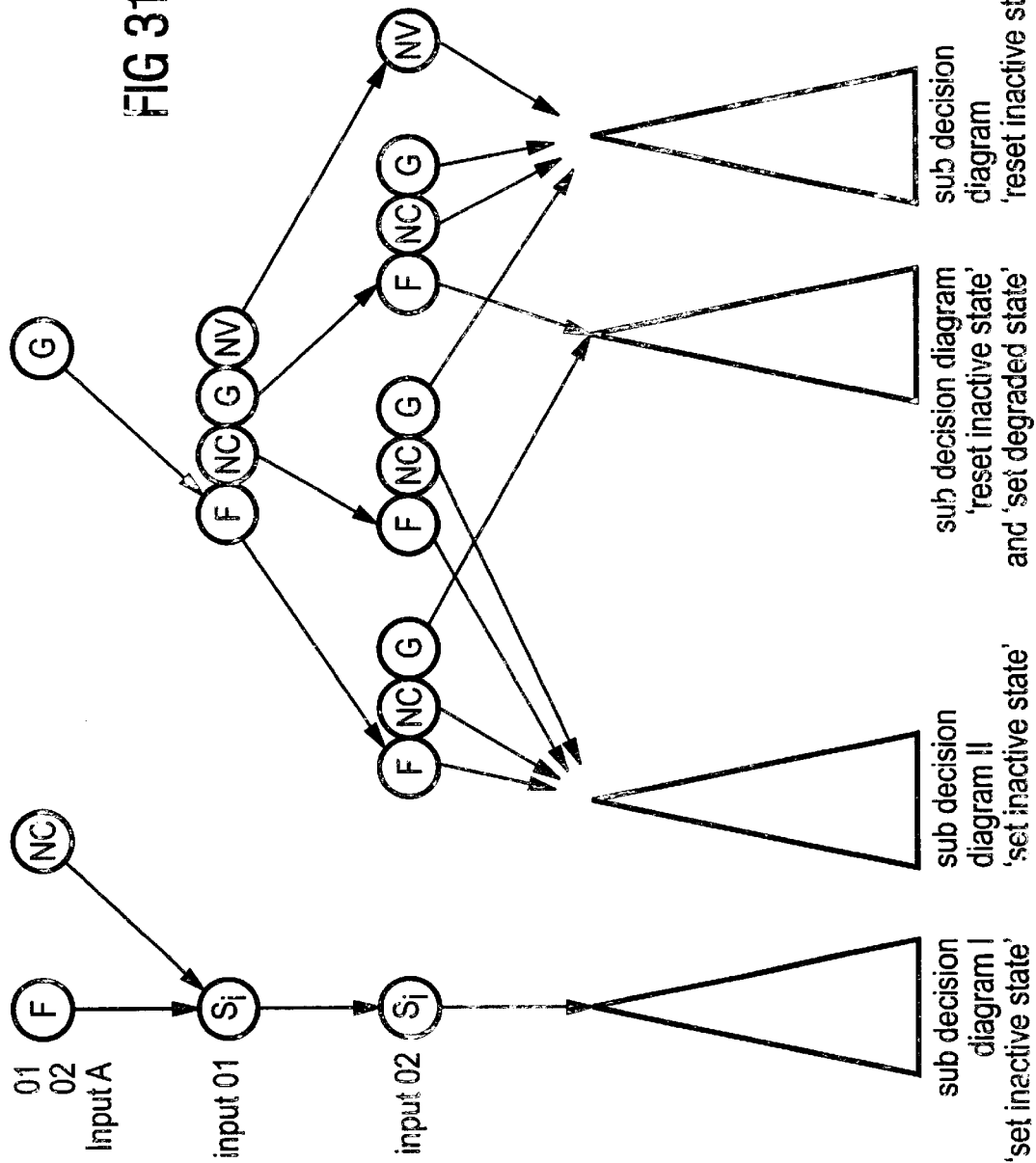

sub decision diagram I 'set inactive state' sub decision diagram II 'set inactive state'

FIG 37

| BACK | OK | FW | DFW | DF | FDN | FN | FT | FL | FDH | FH | NC | NV |
|------|----|----|-----|----|----|----|----|----|----|----|----|----|
| OK | OK | FW | DFW | DF | FDN | FN | FT | FL | FDH | FH | NC | NV |
| FW | OK | FW | DFW | OK | FDN | FN | FT | FL | FDH | FH | NC | NV |
| DFW | OK | FW | FW | OK | FDN | FN | FT | FL | FDH | FH | NC | NV |
| DF | DF | DFW | DFW | DF | FDN | FN | FT | FL | FDH | FH | NC | NV |
| FDN | DF | FW | DFW | DF | FDN | FN | FT | FL | FDH | FH | NC | NV |
| FN | DF | DFW | DFW | DF | FDN | FN | FT | FL | FDH | FH | NC | NV |
| FT | DF | DFW | DFW | DF | FDN | FN | FT | FL | FDH | FH | NC | NV |
| FL | DF | DFW | DFW | DF | FDN | FN | FT | FL | FDH | FH | NC | NV |
| FDH | DF | DFW | DFW | DF | FDN | FN | FT | FL | FDH | FH | NC | NV |
| FH | DF | DFW | DFW | DF | FDN | FN | FT | FL | FDH | FH | NC | NV |
| NC | DF | DFW | DFW | DF | FDN | FN | FT | FL | FDH | FH | NC | NV |
| NV | OK | FW | DFW | DF | FDN | FN | FT | FL | FDH | FH | NC | NV |

FIG 38

| BACK | OK | FW | DFW | DF | FDN | FN | FT | FL | FDH | FH | NC | NV |
|---|---|---|---|---|---|---|---|---|---|---|---|---|
| OK | OK | FW | DFW | DF | FDN | FN | FT | FL | FDH | FH | NC | NV |
| FW | OK | FW | DFW | DF | FDN | FN | FT | FL | FDH | FH | NC | NV |
| DFW | OK | FW | DFW | DF | FDN | FN | FT | FL | FDH | FH | NC | NV |
| DF | DF | FW | DFW | DF | FDN | FN | FT | FL | FDH | FH | NC | NV |
| FDN | FDN | FW | DFW | FDN | FDN | FDN | FDN | FL | FDH | FH | NC | NV |
| FN | OK | FW | DFW | DF | FN | FN | FT | FL | FDH | FH | NC | NV |
| FT | OK | FW | DFW | DF | FDN | FN | FT | FL | FDH | FH | NC | NV |
| FL | OK | FW | DFW | DF | FDN | FN | FT | FL | FDH | FH | NC | NV |
| FDH | FDN | FW | DFW | FDN | FDN | FDN | FDN | FDH | FDH | FDH | NC | NV |
| FH | OK | FW | DFW | DF | FDN | FN | FT | FL | FDH | FH | NC | NV |
| NC | OK | FW | DFW | DF | FDN | FN | FT | FL | FDH | FH | NC | NV |
| NV | OK | FW | DFW | DF | FDN | FN | FT | FL | FDH | FH | NC | NV |

$ind$

FIG 41

```
let  S_F be the set of target HMOs;
let  S_B be empty;
while   (S_F U S_B is nonempty) {
        if  (SF is nonempty) {
                let o be that element of S_F with lowest level;
                let S_F be S_F - {o};
                perform forward implication at o;
        } else if (S_B is nonempty) {
                let o be that element of S_B with highest level;
                let S_B be S_B - {o}
                perform backward implication at o;
        }
}
```

FIG 42

```
for  (all operators op fed by MO o) do  {
        let i_1,...i_n be the inputs of op and y be the output;
        S_new (y) = op_for (S_old (i_1),...S_old (i_n);
        if    (S_new (y unequal S_old (y)) {
                if  (y is a no terminal node) {
                        add y to S_F;
                }
        }
        add y to S_B;
}
```

FIG 43

```
let op be the unique operator with output MO o;
if (type of op is EXTF) {
    let I be the IN input MO of op;
} else if (type of op is PDEP) {
    let I be the NONDOM input MO of op;
} else if (type of op is AND or ANDp or OR) {
    let I be all inputs of op;
}
for (all i of I) do {
    S_new(i) = op_back (S_old (O), S_old (i));
    if  (S_new (i) unequal S_old(i)) {
        if  (i is no initial node) {
            add i to S_B;
        }
    }
    if  (i feeds more operators) {
        add i to S_B;
    }
}
```

TELECOMMUNICATION NETWORK AND STATE PROPAGATION METHOD

BACKGROUND OF THE INVENTION

The present invention relates to a telecommunication network and a state propagation method for monitoring and performing the state propagation of various objects of network elements.

Operation, maintenance, and administration functions exist in any telecommunication network. The GSM (global system for mobile communication) specification covers these functions. The general philosophy of telecommunication management networks is that all management operation will take place on an abstract representation of network elements. The information model of GSM, see M. Mouly, M. B. Pautet, "The GSM System for Mobile Communications," 1992, gives an abstract system view.

Network elements are modeled as managed objects (MOs). More generally, managed objects represent anything which is managed. For example, the information model also covers managed objects such as tests or observations. The objects themselves are instances of classes. A class is a description of the attributes, properties, and actions which are common to all objects belonging to the class. The concept of generic GSM object classes is very close to object oriented programming.

Generic states and status attributes are used to describe the operability and availability of the managed objects. For instance, the state of a managed object may be locked, disabled or degraded. Between the managed objects there may exist complex relationships. The relationship stem from the GSM containment tree, the hardware architecture, the wiring of the boards, the grouping of boards to functional units etc. Generally, any state transition of a managed object may result in a sequence of state changes of other related managed objects.

These dependencies are described as relationships in the source code of a maintenance software for a network element. This code is complex and difficult to adapt in case of a hardware modification of the network element. Large numbers of managed objects cause a breakdown of this concept, especially if all multiple faults are considered.

SUMMARY OF THE INVENTION

It is an object of the present invention to identify a telecommunication network and a state propagation method which manage even a large number of managed objects and which guarantees the state consistency of all managed objects even in the case of multiple faults.

According to the invention, a telecommunication network comprises an operation and maintenance device and a plurality of network elements, each of the network elements having hardware objects. At least one network element communicates state changes to the operation and maintenance device. The operation and maintenance device comprising: a memory device for separately storing a state dependency graph with objects, states of the objects and operators, and for also storing a set of rules allocated to the operators; and a processing device, which processes the communicated state changes by applying the rules to the operators of the graph and calculates new states of all objects that depend on the communicated state changes.

The correct calculation of all managed object states is the basis of a reasonable operation, maintenance and administration of the telecommunication network and its elements.

The present invention shows a new and versatile state propagation method for the network elements such as base stations of mobile communication systems. The algorithm may also be applied to the whole telecommunication system or parts of it with at least two network elements.

The proposed state propagation algorithm automatically calculates all state transitions that follow from the state change of a target managed object. This state change has been communicated to the operation and maintenance device. This device may be part of a network element to be managed or may be regarded as a supplementary network element in form of a operation and maintenance center.

The memory device of the operation and maintenance device stores the relationships between the managed objects modeled by a general dependency graph. The dependency graph consists of managed objects and operators, like AND/OR functions describing the type of relationship between managed objects.

The graph may be created automatically using a simple description language as input. The concept of a general or a maximal graph allows the simultaneous treatment of different hardware configurations. The propagation algorithm is basically a guided graph traversal both in a forward direction (from initial to terminal nodes) and a backward direction. During the traversal the new states of the managed objects are calculated. The next state calculation is based on implication rules. It is not necessary to recalculate all states if parts of the graph are not influenced by a state change.

The rules, which are associated with the operators, are either stored in truth tables or in general decision diagrams. The method can easily be tailored to new relationships and requirements. The latter requires simply the adaption of the dependency graph and the rules.

The signaling between different network elements and the operation and maintenance device is reduced significantly using the state propagation algorithm. A state change of one of the managed objects normally causes state changes of other managed objects. These new states of the dependent objects do not have to be communicated too the operation and maintenance device. The communication of just one state change may be sufficient.

Another advantage of the present invention is the concentration of the state dependencies in one graph. By applying forward and backward rules the need for a greater split in different graphs is reduced. In addition, less memory space is required.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 3 describes state and status attribute values of managed objects;

FIG. 5 describes the reduced state set;

FIGS. 6a–6b describe the mapping of external to internal states;

FIGS. 7a–7b describe the demapping of internal to external states of a hardware managed object;

FIG. 8 describes the demapping of internal to external states of a state of a base station site manager;

FIG. 9 describes the demapping of internal to external states of a base station;

FIG. 10 describes the demapping of internal to external states of a transceiver;

FIG. 19 describes the dependency graph of a TRX;

FIG. 21 describes the fault hierarchy;

FIG. 22 describes the forward rules of an AND operator;

FIG. 25 describes the forward rules of an AND priority operator where the priority input i1 dominates input i2;

FIG. 26 describes the inputs of an PDEP operator;

FIG. 27 describes the forward rules of an PDEP operator where ind depends physically on id;

FIG. 30 describes the Intersection table between internal states;

FIGS. 31–35 describe Part I to V of the decision diagram of an EXTF operator;

FIG. 37 describes the backward rules of an AND, OR, ANDp and EXTF operator;

FIG. 38 describes the backward rules of a PDEP operator;

FIG. 41 describes the state propagation algorithm;

FIG. 42 describes the forward propagation algorithm; and

FIG. 43 describes the backward propagation algorithm.

DESCRIPTION OF THE PREFERRED EMBODIMENTS

Figure 1:
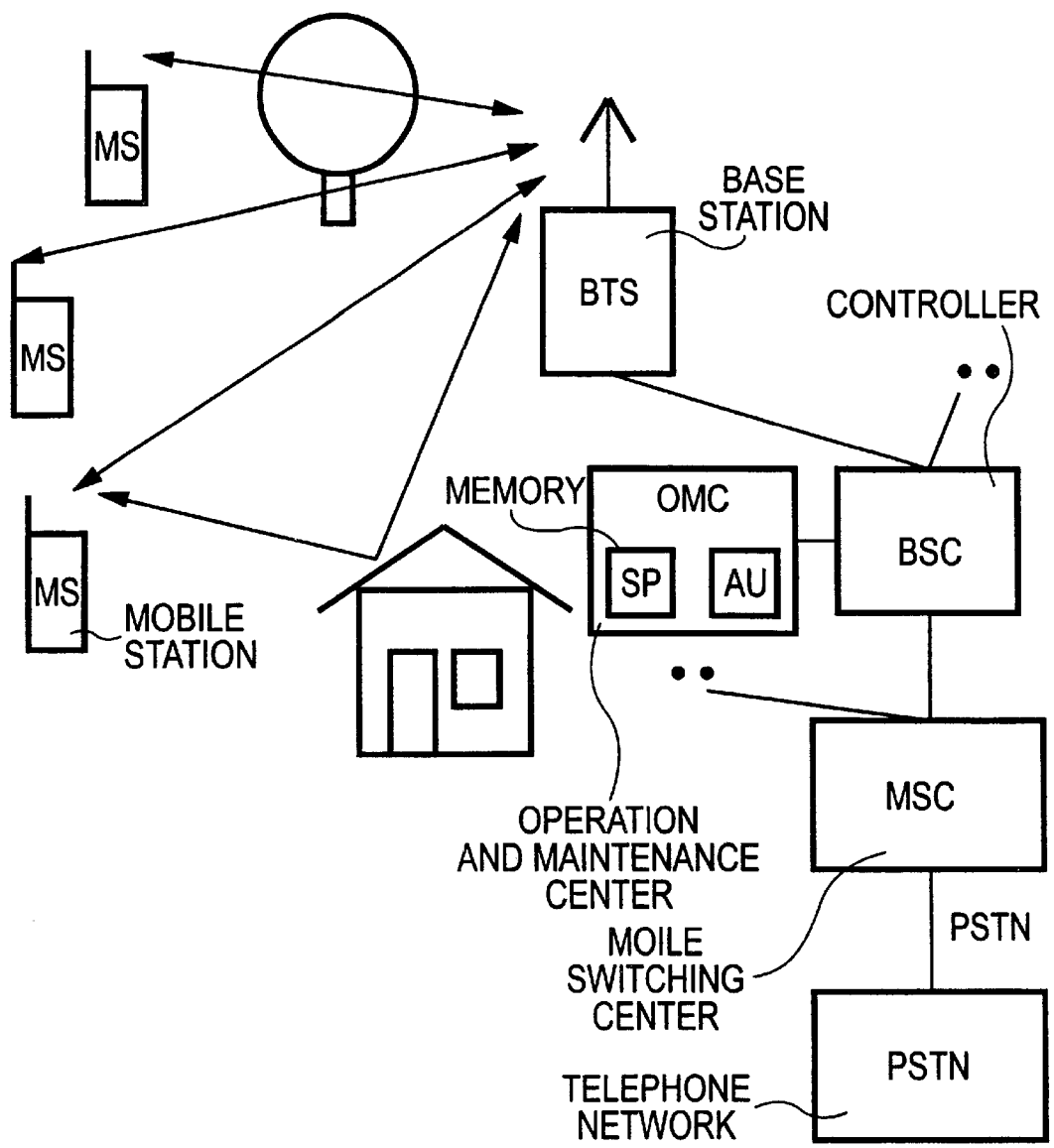
FIG. 1 represents a general view of a digital mobile communication system.

The digital mobile communication system according to FIG. 1 has a mobile switching center MSC in which an interworking unit IWF is integrated in order to implement an interface to a public switched telephone network PSTN. A split of the digital mobile communication system into regional sectors is achieved by way of a plurality of mobile switching centers MSC each of which is associated with a regional sector, and which are networked to each other, within each regional sector, a mobile switching center MSC is linked to base stations BTS via base station controllers BSC.

Each base station BTS serves an individual cell. The digital mobile communication system has a cellular structure wherein cells are served by base stations BS. The links between the individual fixed components MSC, BSC, BTS of the digital mobile communication system are normally produced by lines. This structure of a digital mobile communication system is illustrative of a telecommunication network with a plurality of different network elements. Another function split between different system components may also be chosen.

The structure of the digital mobile communication system shown in FIG. 1 serves to provide communication of a plurality of mobile stations MS. These mobile stations MS are linked to the base stations BTS via a radio interface, thereby providing the mobile stations MS with a facility for mobile communication. The base station BTS operates to provide radio communications within a radio coverage associated with a cell. However, as a rule the base station BS may provide radio coverage beyond the cell boundary area associated with an individual base station BTS.

An operation and maintenance center OMC serves as an operation and maintenance device which is connected to a base station controller BSC and fulfills operation and maintenance functions for the base station controller BSC and the base stations BTS linked to this base station controller BSC. Information about faults and the traffic load of these components are provided to the operation and maintenance center OMC so that the operator will be warned. Whenever possible, the system adapts its configuration so as to provide continuous operation. The operation and maintenance center OMC contains a memory device SP for storing a state dependency graph with objects, states of the objects and operators, and a set of rules allocated to the operators, as well as a processing device, which processes the communicated state changes by applying the rules to the operators of the dependency graph and calculates the new states of the objects that depend on the communicated state changes.

The following embodiment shows a base station BS as the network element to be modeled. The same method can be applied to one or more other network elements such as the mobile switching center MSC, the base station controller BSC or a transcoding unit.

The managed objects MO of the base station BS can be divided into equipment related MOs (HMO) and functional MOs (FMOs). Equipment related MOs represent hardware components like a rack, a board a least replaceable unit (LRU) or a least configuration unit (LCU). The FMO represents a certain functionality which is provided by a bunch of hardware. The latter causes relationships and state dependencies between FMOs and HMOs.

Figure 2:
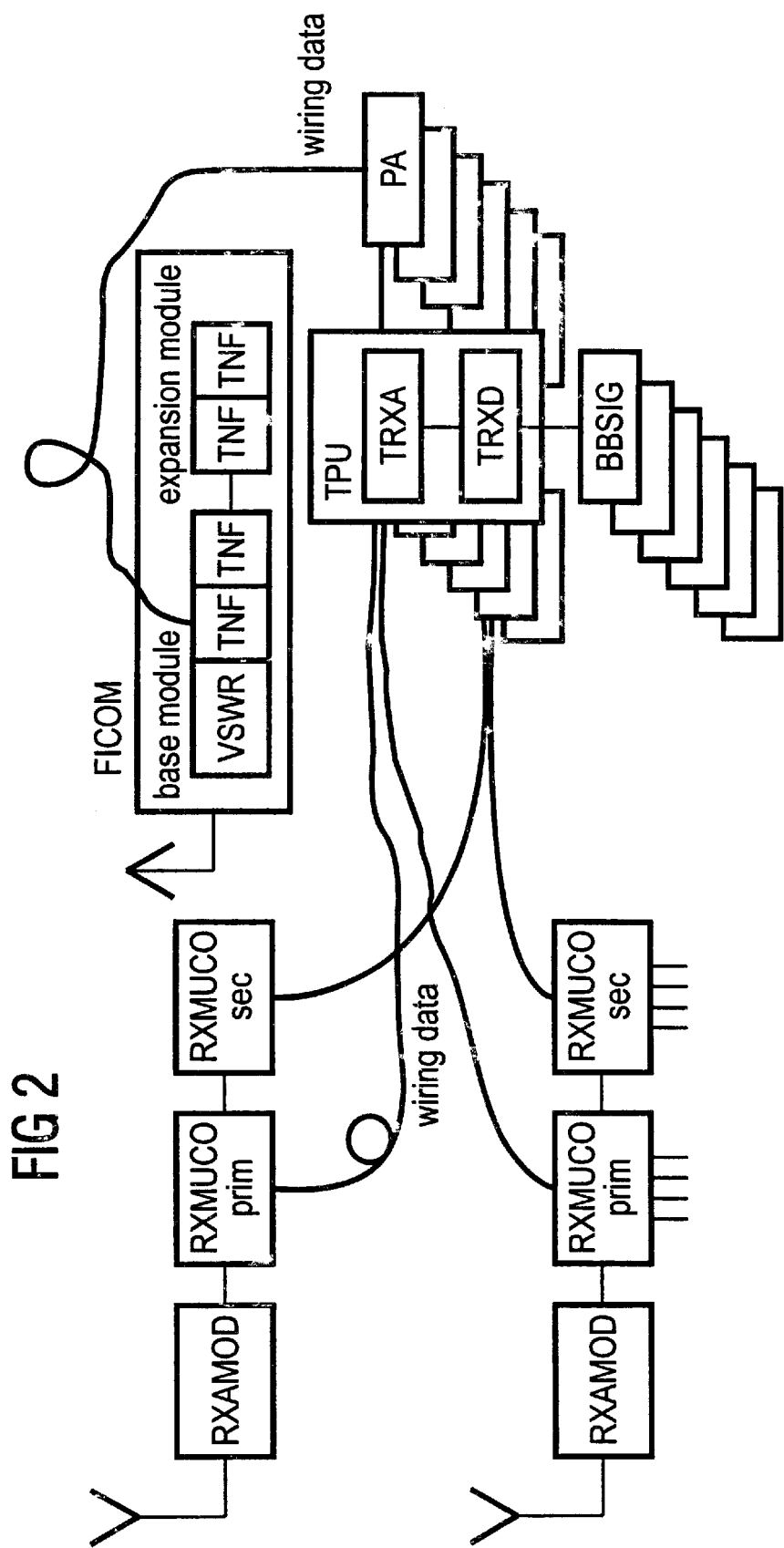
FIG. 2 describes hardware managed objects of a base station.

FIG. 2 depicts the MOs of a base station BS. All HMOs are shown in squared boxes. Each HMO represents either a LRU or a LCU. In many cases the LRUs are single boards. As indicated, there may be several instances of the same HMO. The instances are distinguished by different numbers ranging from 0 to n−1.

The core hardware (HW) consists of a core controller board CCTRL, the common clock board CCLR, the generic power supply unit GPSU, the link interface LI, and the alarm and control board ALCO.

The receive path of the antenna comprises several receiver antenna modules RXAMODs and receiver multi-couplers RXMUCOS. The RXMUCOs may be cascaded (primary and secondary units). In case of antenna diversity the receive path is doubled. The transmitter part of the antenna may be either a hybrid combiner HYCOM or a duplexer DUCOM or a filter combiner FICOM. While both a HYCOM and a DUCOM is a LRU, a FICOM can be further split into two LRUs: a base and expansion module. The base module contains an antenna part with a VSWR supervision unit and a couple of tunable narrow band filter stages TNFs which can be tuned to a particular frequency. The expansion module includes only TNFs. Note that both a VSWR and a TNF represent a LCU. To cover the more general case we will suppose that the transmit part of the antenna is a FICOM.

The carrier related HW consists of four boards:

1) an analog part of the transceiver TRXA;
2) a digital part of the transceiver TRXD;
3) a base band and signaling unit BBSIG;
4) a power amplifier board PA.

In addition, although a TNF is part of a FICOM it is viewed as a carrier related HW. The wiring between the RXMUCOs and TRXAs respective FICOMS and PAs is flexible.

Four different FMOs can be distinguished; one base station site manager BTSM, up to three base transceiver stations BTS, up to six transceivers TRX per BTS, and eight channels CHAN per TRX. There are hierarchical dependencies between the mentioned FMOs. A CHAN is part of a TRX function, itself part of a BTS function, itself part of the BTSM.

MOs can be created and deleted. Since a FMO requires a bunch of HW an assignment of HMOs to FMOs is performed after FMO creation. Since there is only one BTSM the HW assignment to a BTSM is unique. The assignment of antenna related HW to a BTS is uniquely determined by the cell number. In other words the antenna system I consisting of VSWRI, RXAMOD I/I+1, and primary RXMUCOs I/I+1 is assigned to BTS I, I-0, 1, 2. The assignment of carrier related HW to a TRX is done according to the wiring data and the MO numbering. The wiring date determine the carrier related HW groups (TRXA, TRXD, BBSIG, PA, TNF) of a BTS.

The availability and operability of MOs are described by generic states and generic state attributes. There are three generic states: the administrative state (AST), the operational state (OST), and the usage state.

Status attributes provide additional information about the condition of a MO. For example, if the operational state of a MO is disabled, the status attribute may express the reason why the MO is inoperable. The following status attributes are defined: the alarm status, the procedural status (PRS), the availability status (AVS), the control status, and the standby status.

Only the administrative state AST, the operational state OST, the availability status AVS, and the procedural status PRS are used in the following description.

On one hand, the OST, AVS and PRS represent MO specific data, i.e., they can exclusively be changed by the software which knows the state of the corresponding hardware. On the other hand, the AST is exclusively managed by the operator. While AST and OST are single valued, AVS and PRS may represent several values.

FIG. 3 depicts the values of AST, OST, AVS and PRS. Note that only those values are listed that are relevant to the MOs of a base station BS. In addition, only a subset of the attribute values may be applicable to a specific MO.

As explained above, the state of a MO generally depends on the states of other MOs. For example, consider the carrier related MOs TPU, BBSIG and PA of a TRX. If the TPU moves from current state (unl, ena, nul, nul) to next state (unl, dis, fai, nul) the corresponding BBSIG, PA, and also the TRX itself assume a new state. In particular, the BBSIG assumes the inactive state (unl, ena, ofd, nul), the PA assumes the physical dependent state (unl, dis, dep, nul), and the TRX state becomes (unl, dis, dep, nul).

The task of the propagation algorithm is to calculate all state transitions that follow from a given state transition of a target MO. Using the above example again, the target MO is the TPU and the state propagation method has to determine the new states of the BBSIG, PA, and the TRX. More generally, the propagation method has to calculate the states of FMOs in dependence on the states of HMOs, inactive states of HMOs, and physically dependent states of HMOs.

Now assume that (AST, OST, AVS, PRS) denotes the current state of an HMO. In addition assume that the state of an HMO o has to be changed. Then, the following steps have to be performed by layer 1 and 2:

1) The target HMO o assumes the required target state (AST', OST', AVS', PRS');
2) The target state (AST', OST', AVS', PRS') is mapped to an internal state. As will be shown later, this state mapping technique drastically reduces the number of states required for state propagation. Note that the mapping function is unambiguous;
3) The state propagation algorithm calculates the new internal state of all FMOs and HMOs that depend on o. The result of this step of modified Mos which is denoted by S;
4) The internal state of each MO included in S is demapped to a well defined external state (AST", OST", AVS", PRS"). Note that the demapping function is unambiguous;
5) The external states (AST", OST", AVS", PRS") are assigned to the MOs contained in S. These states can be viewed as next states;
6) The actions associated with the state transition form current state (AST, OST, AVS, PRS) to next state (AST", OST", AVS", PRS") are carried out.

For the given hardware configuration the state propagation rules and the state propagation algorithm are separated. The state dependencies between MOs are now represented by a dependency graph and a set of forward and backward propagation tables. The state propagation algorithm uses the graph and the propagation tables as an input and calculates the new states of all depending MOs. The main advantage of this approach is that new state dependencies have only an influence on the dependency graph, but not on the state propagation algorithm.

The complete set of external states is not required for the state propagation. Some external states can be mapped into a single state as they exhibit the same behavior with respect to the state propagation. The proposed reduced state set is therefore especially useful to reduce the modeling and calculating effort for the state propagation. For example, it must not distinguish between the external states (unl, dis, fai, nul), (unl, dis, noi, nul), and (unl, dis, (fai, tst), nul). Each of them represents a permanent fault. If a target MO assumes one of these states, each depending MO assumes the same state in all three cases. Hence, a smaller set of internal states is introduced. Note that the set of internal states is as small as possible, i.e., no further reduction is possible without loss of information required for the state propagation task.

Each external state given by the quadruplet (AST, OST, AVS, PRS) is mapped to an internal state. FIG. 5 gives a description of all internal states. Totally, there are 32 external states and only 12 internal states.

Figure 4:
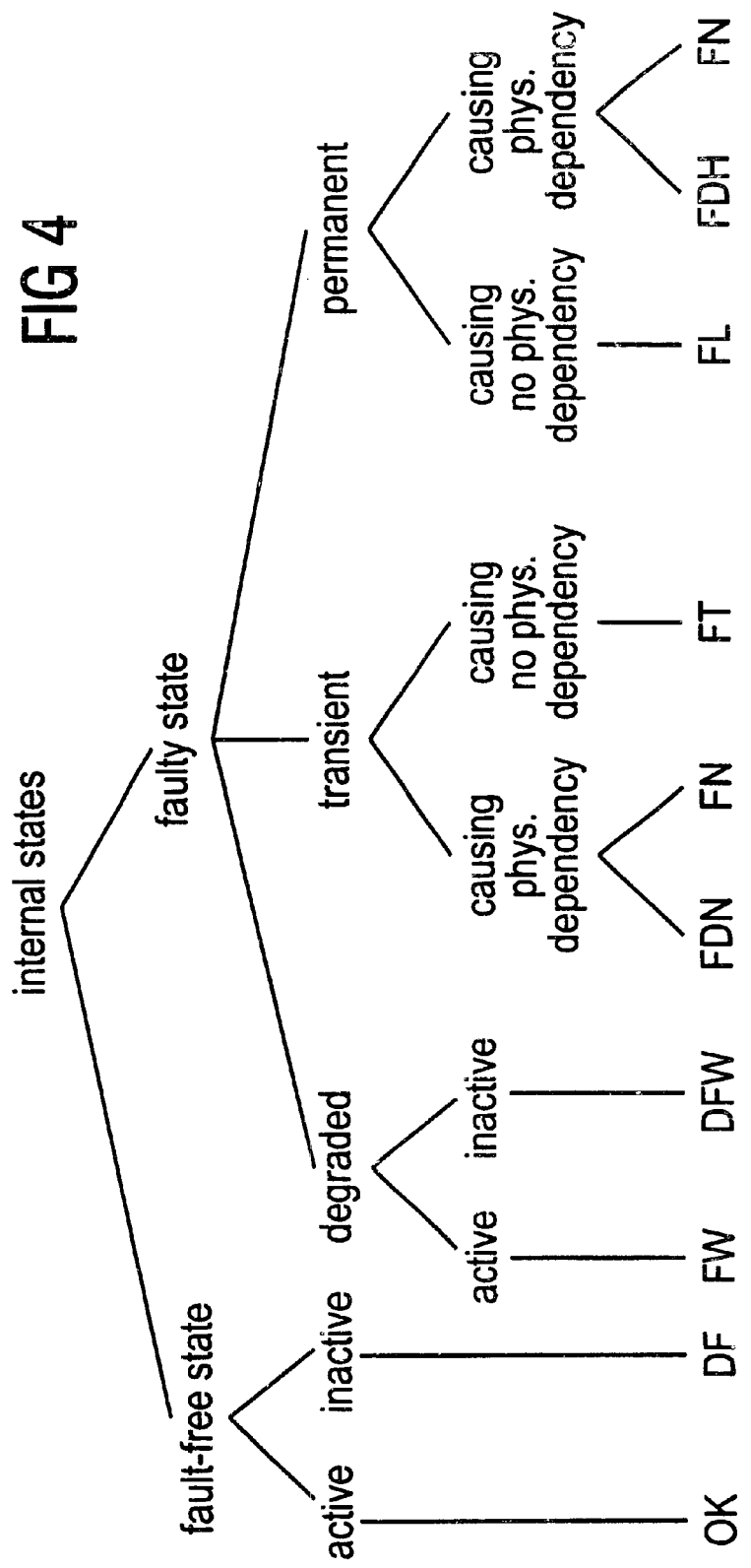
FIG. 4 describes the classification of internal states.

FIG. 4 depicts a classification of the internal states. First of all, the internal states are divided into a set of fault-free states and a set of faulty states. Within the fault-free states we distinguish between an active and an inactive state. The active state is denoted OK and the inactive state is denoted DF. A MO with state OK provides full service. The inactive state indicates a fault-free MO that cannot provide service since another set of MOs is faulty.

The faulty states are further partitioned into degraded, transient, and permanent faults. While a degraded MO provides service, a transient or permanent faulty MO provides no service. Again, a degraded MO can assume an active state (FW) and an inactive state (DFW) due to inactive state dependencies.

Within transient and permanent faults it must be distinguished between states causing a physical dependency and states causing no physical dependency. Transient faults FDN and FN of an MO result in a physically dependent MO. The same holds for the permanent faults FDH and FH. The transient fault FT and permanent fault FL, however, does not lead to a physically dependent MO.

Finally, the difference between FDN and FN (FDH and FH) is that FDN (FDH) indicates a MO that is physically dependent on another MO while a MO with state FN (FH) does not physically depend on another MO.

A mapping function is used to map an external state to an internal state. FIG. 6 shows the mapping function. For example, external state (unl, ena, nul, nul) is mapped to internal state OK. Note that each not created HMO gets the internal value NC. As can be seen in FIG. 6, many external states are mapped to the same internal state.

The relationships describing the state dependencies between MOs are represented by a general dependency graph. The dependency graph describes all three types of state dependencies:

1) the state dependencies between FMOs and HMOs;
2) the inactive state dependencies between HMOs; and
3) the physical state dependencies between HMOs.

Figure 11:
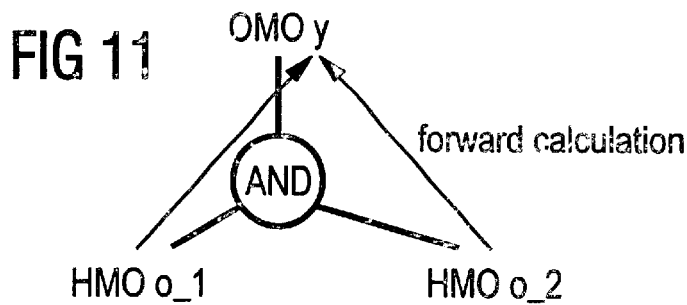
FIG. 11 describes the modeling of state dependencies between functional and hardware managed objects.

The dependency graph consists of MOs and operators like an AND or OR operator. The operators describe the type of state dependencies between MOs. Each operator has several input MOs and a single output MO (OMO). Three types of MOs are distinguished: 1) HMOs, 2) intermediate MOs (IMOs), and 3) output MOs (OMOs). All HMOs represent initial nodes in the graph. Only the internal states of the initial nodes can be set. Outputs of operators are IMOs. Those IMOs related to a FMO are denoted OMOs. The internal state of an OMO is used to determine the OST and AVS of the corresponding FMO. FIG. 11 depicts a simple example dependency graph.

Modeling of state dependencies between FMOs and HMOs: For simplicity, it is assumed that an FMO depends only on two HMOs. To provide the functionality of the FMO both HMOs are required. If one HMO is disabled the FMO becomes disabled. To model this simple state dependency, an AND operator is used. The corresponding dependency graph is shown in FIG. 11. To calculate the state of OMO y in dependence on the states of HMOs o__1 and o__2, forward rules are used. A complete description of all forward rules of an AND operator is given later. Each time the state of o__1 and o__2 is changed a forward calculation is required to update the state of y.

In principle, each type of state dependency between FMOs and HMOs can be modeled using a set of elementary operators. To model the state dependencies between the FMOs and HMOs of the base station BS, an AND operator, an OR operator, an ANDp operator, and an EXTF operator is used. Note that these operators are sufficient to calculate the OST and AVS function of the BTSM, a BTS, and a TRX.

Figure 12:
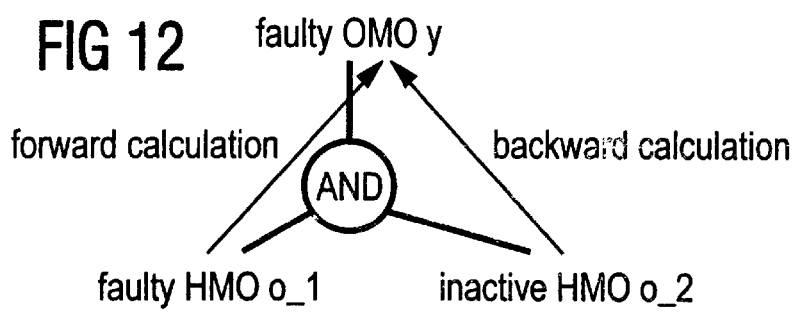
FIG. 12 describes the modeling of inactive state dependencies between hardware managed objects.

Modeling inactive state dependencies between HMOs:

These state dependencies are implicitly modeled in the dependency graph by using backward rules. The output of an operator indicates the state in dependence on the states of its inputs. Hence, if the output of an operator has a faulty state, all inputs can assume an inactive state. To illustrate this, let us use the example graph of FIG. 12. Let us assume the o__1 has a faulty state. The forward calculation gives a faulty state of y. Next, backward rules are applied. Since y has a faulty state and o__2 has a fault-free state, o__2 gets an inactive state. A detailed description of all backward rules can be found in Section "Backward Rules".

Figure 13:
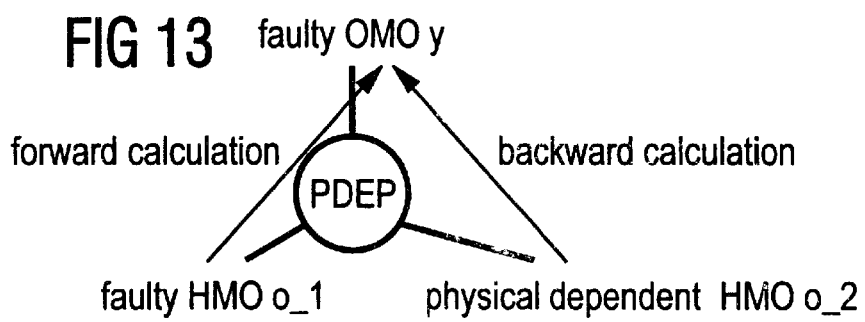
FIG. 13 describes the modeling of physical dependencies between hardware managed objects.

Modeling physical state dependencies between HMOs: To model these state dependencies an additional operator called PDEP (Physical Dependency) is required. FIG. 13 shows an HMO o__2 which is physically dependent on HMO o__1. Note that HMO o__1 has an influence on HMO o__2 but not vice versa. Consequently, no backward calculation is performed from y to o 1. A detailed description of the PDEP operator is given in Section "PDEP Operator".

Figure 14:
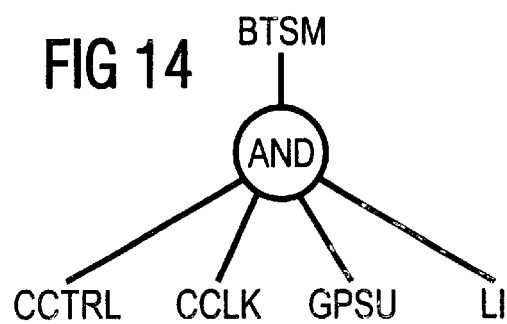
FIG. 14 describes the dependencies graph of the base station site manager.

The four HMOs CCTRL, CCLK, GPSU, and LI are required to provide the BTSM function. Thus, an AND operator is used to model this kind of state dependency (see FIG. 14). Note that other core HMOs ALCO, AC__DC and FAN have no influence on the state of a BTSM.

Figure 15:
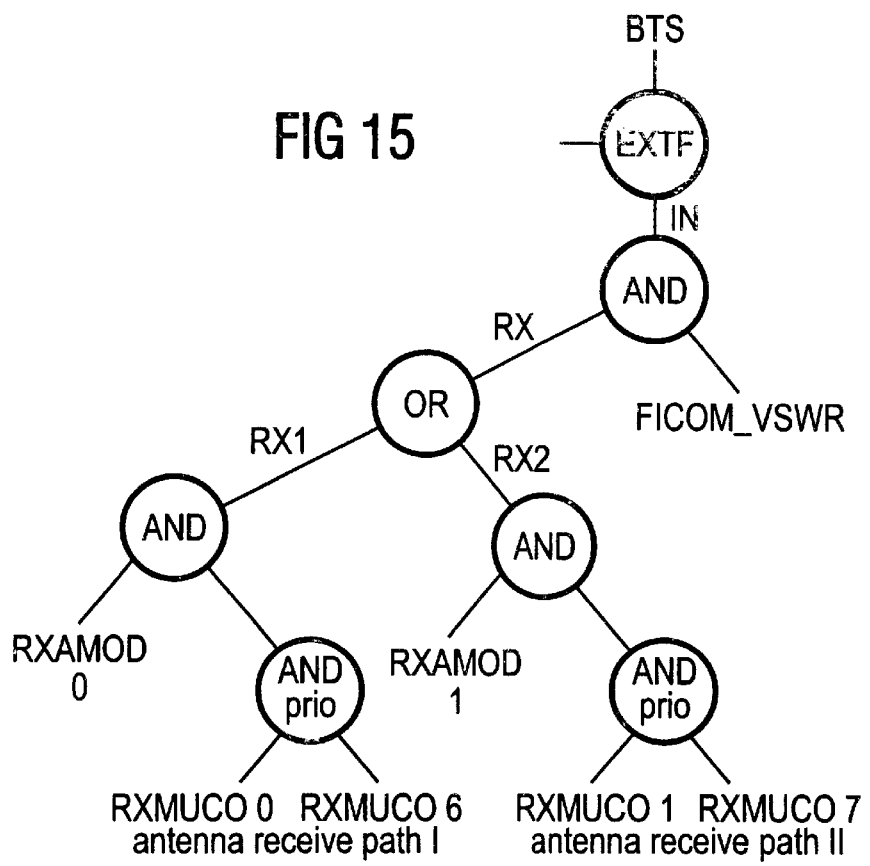
FIG. 15 describes the dependency graph of a base station having antenna diversity and cascaded RXMUCOs.

The dependency graph of a BTS depends on whether antenna diversity is used and on whether the RXMUCOs are cascaded. FIG. 15 depicts the dependency graph of a BTS which has both antenna diversity and cascaded RXMUCOs. The EXTF operator models the state dependencies on the HMOs of a BTSM. An enabled BTS requires both an enabled transmit and receive path. Hence, HMO FICOM__VSWR and IMO RX are inputs of an AND operator. The receive function of the antenna is enabled if at least one receive path (RX1 or RX2) is enabled. Hence, an OR operator is used to describe this state dependency (RX=RX1 or RX2). The state dependencies between primary and secondary RXMUCOs are described by an ANDp operator. Additional cascaded RXMUCOs can be easily modeled by using further ANDP operators.

Figures 17, 18:
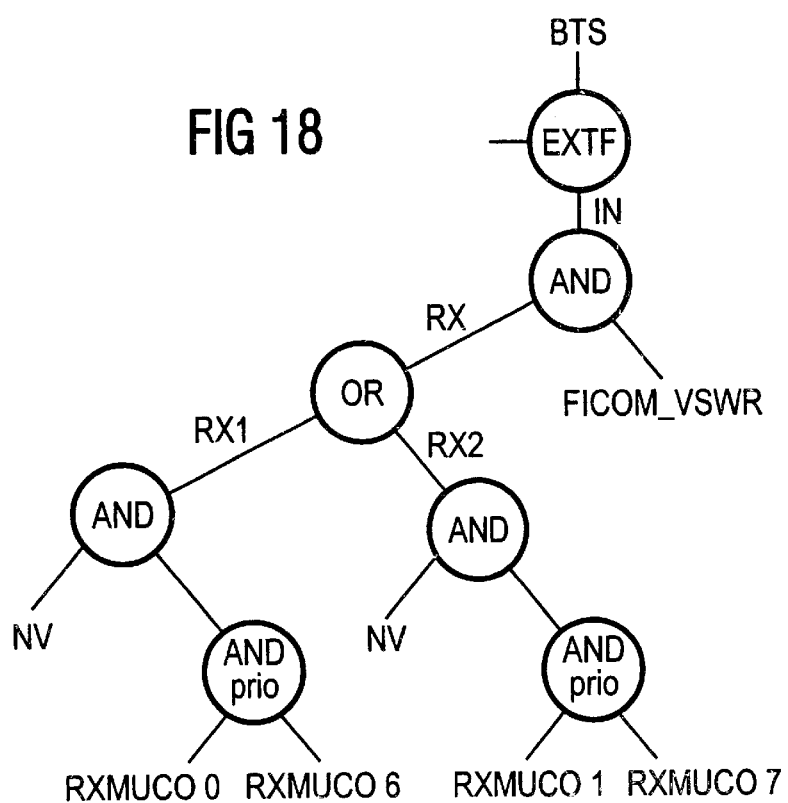
FIG. 17 describes the required state assignments to the HMOs of the maximal base state graph to get a smaller HW configuration.
FIG. 18 describes the dependency graph of a base station having RXAMCOs.

Totally, there are at least four different HW configurations (with/without diversity and with/without cascaded RXMUCOs). Instead of using four different dependency graphs, a general or maximal BTS graph is used to simultaneously model all possible HW configurations. Each smaller HW configuration with no antenna diversity or no cascaded RXMUCOs can be easily obtained by assigning the internal state NC (not created) to the corresponding HMOs. FIG. 17 lists the state assignments required for the different HW configurations.

Figure 16:
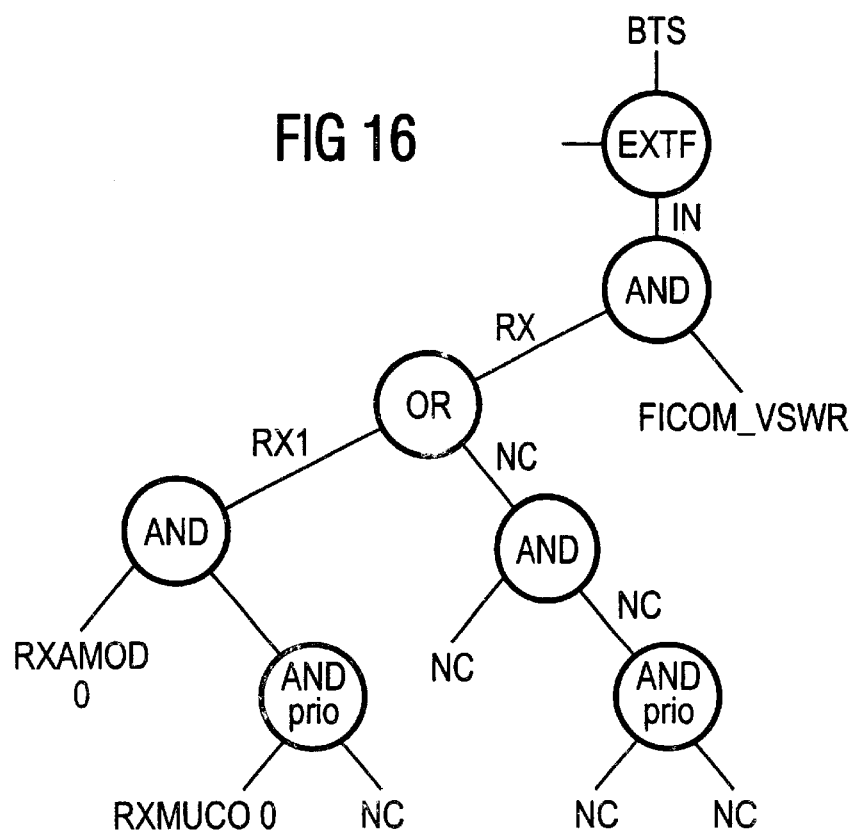
FIG. 16 describes the dependency graph of a base station having no antenna diversity and no cascaded RXMUCOs.

For example, if there is no antenna diversity and no cascaded RXMUCOs, state NC is assigned to RXMUCO 6 and to all HMOs of antenna receive path II (see FIG. 16). According to Section "Rules Associated with Operators", IMO RX2 assumes state NC. Since RX1 OR NC=RX1 (see Section "OR Operator"), all HMOs of antenna receive path II have no influence on the state of the BTS and on the state of the created HMOs FICOM__VSWR, RXAMOD 0, and RXMUCO 0. In addition, since RXMUCO 0 ANDp NC=RXMUCO 0, the secondary RXMUCO 6 has no influence on the state of the BTS and on the state of the created HMOs.

Finally, an RXMUCO may be of type RXAMCO. In this case there is no RXAMOD. To model this case the internal state NV (neutral value) has to be assigned to an RXAMOD. In addition, RXAMCO I corresponds then to RXMUCO I in the graph. FIG. 18 depicts this situation.

FIG. 19 shows the dependency graph of a TRX. The EXTF operator models the state dependencies on the HMOs of a BTS group. The physical dependencies between a TRXD and a PA and a TRXD and a TRXA are described by PDEP operators. Since each failure of a carrier-related HMO results in a disabled TRX, the HMOs BBSIG, FICOM_TNF, PA, TRXD, and TRXA are inputs of AND operators.

If the PA of the TRX is wired with a HYCOM or DUCOM, no HMO FICOM_TNF is required. In this case, the internal state NV (neutral value) has to be assigned to HMO FICOM_TNF.

There are edges between the BTSM and BTS graph as well as between the BTS and TRX graph. The edges between the BTS and TRX graph can be only created if the wiring data are known.

Figure 20:
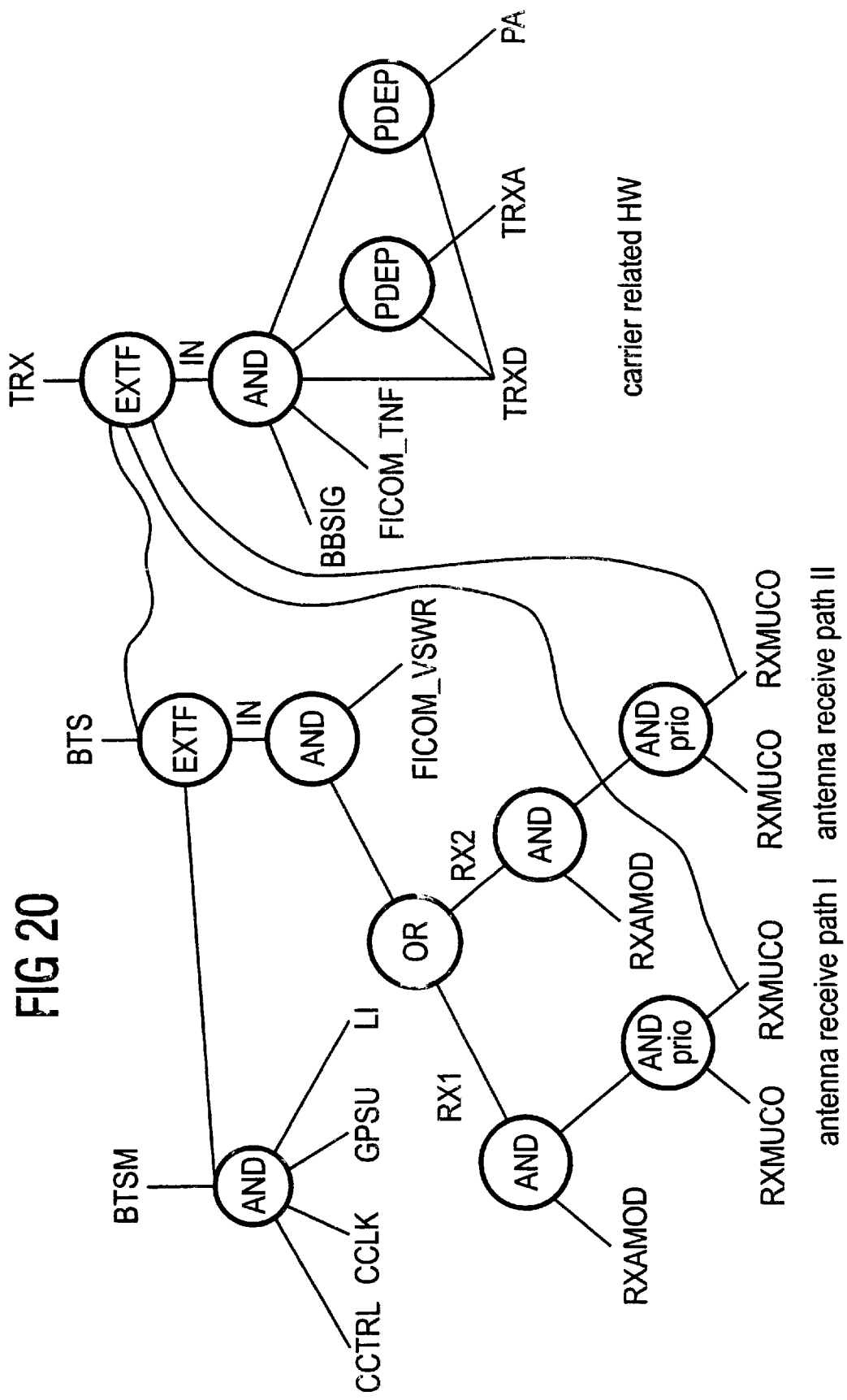
FIG. 20 describes the complete dependency graph.

FIG. 20 illustrates the complete dependency graph including all edges. The HMOs CCTRL, CCLK, GPSU and LI have an influence on the BTS state via the edge from OMO BTSM to the EXTF operator of the BTS. To properly model the influence of the antenna related HW on the corresponding TRXs, three edges from the BTS to the TRX graph are required. Note that the edges from the RXMUCOs of the BTS graph to the EXTF operator of the TRX graph reflect the wiring data between the RXMUCOs/TPUs.

Basic Definitions of Forward Rules are as follows:

The set of all internal states is denoted as $S_i$={OK,FW,DF,DFW,FDN,FN,FL,FDH,FH,NC,NV}, There is a partial order between internal states (see FIG. 21). It can be said that internal state s1 is stronger than internal state s2 if s2<s1. Note that the relation '<' is transitive;

An operator '•' is commutative if o1•o2=o2•o1, where o1,o2∈$S_i$;

An operator '•' is associated if (o1•o2)•o3=o1•(o2•o3), where o1,o2,o3∈$S_i$;

Let '•' be an operator. It can be said that NV is the neutral state if o1•NV=o1 and NV•o1=o1, where o1∈$S_i$.

The following operators have been designed in order to facilitate the establishment of the dependency graph and the calculation of the state propagation.

An AND operator is used if several inputs are required for the functionality. If one input fails the complete functionality fails. Hence, the output of an AND operator assumes a faulty state if at least one of its inputs has a faulty state. An AND operator may have an arbitrary number of inputs. Since the AND operator is associative we will suppose a two-input AND operator. Note, however, that all results can easily be generalized to an n-input AND operator.

The truth table of an AND operator is depicted in FIG. 22. FIG. 22 gives the state of the operator output y in dependence on the states of its inputs i1 and i2, obviously, the AND operator is commutative. In addition it can be shown that the associative law holds, too. The neutral state is NV (the only exception is that a physically dependent state is not propagated to the output, i.e., FDN AND NV=FN and FDH AND NV=FH).

If exactly one input is not created the output state is faulty (state FH at y). The latter indicates that both inputs have to be created to provide the functionality. The output assumes state NC if and only if both inputs are not created. Hence, the state NC at the output of an AND operator indicates that none of its inputs is created. This exception is required only for the handling of different HW configurations (using the same dependency graph).

In order to explain the remaining forward rules associated with an AND operator the input combinations of FIG. 22 are partitioned into three parts:

1) Part I: Both inputs are either fault-free or degraded, i.e., i1={OK,FW,DFW,DF} and i2={OK,FW,DFW,DF};
2) Part II: One of the inputs is either fault-free or degraded and the other one has either a transient or permanent fault, i.e., i1={OK,FW,DFW,DF} and i2={FDN,FN,FT,FL,FDH,FH} or vice versa;
3) Part III: Both inputs have either a transient or permanent fault, i.e., i1={FDN,FN,FT,FL,FDH,FH} and i2={FDN,FN,FT,FL,FDH,FH}.

The following refer to Forward Rules for Part I.

Input combinations i1={OK,FW) and i2={OK,FW}:

The output has state OK if both inputs have this state and the output has state FW if one input has this state. The latter rules propagate a degraded state from an input to the output. A fault-free state at the output indicates that all inputs are fault-free.

All remaining input combinations can only occur if one or both inputs have been set inactive by a preceding backward implication. The backward implication sets either a fault-free or a degraded input to inactive. The resulting state at the input is either DF if the preceding state was OK and DFW if the preceding state was FW.

Input combinations i1=OK and i2={DF,DFW}:

Assume now that exactly one input of the AND operator assumes a transient/permanent fault or is not created. Since both inputs are required for the functionality, the output assumes a faulty state and, consequently, the other input has to assume an inactive state. Hence, the following state dependencies between the inputs and an AND operator:

i1={FDN,FN,FT,FL,FDH,FH,NC}∧i1=OK→i2=DF and vice versa, as well as i1={FDN,FN,FT,FL,FDH,FH,NC}∧i1=FW→i2=DFW and vice versa. To perform these implications a forward and a backward rule is used. According to FIG. 22, the input combination i1={FDN,FN,FT,FL,FDH,FH,NC} and i2∈{OK,FW} result in the output state y∈{FN,FL,FT,FH}. To propagate state DF resp. DFW to input i2 the backward rules y∈{FN,FL,FT,FH}∧i2=OK→i2=DF and
y∈{FN,FL,FT,FH}∧i2=FW→i2=DFW are applied.

Assume that the fault at input i1 disappears. If input i1 becomes fault-free, i.e., i1=OK, the inactive state dependency between i1 and i2 is no longer valid. Thus, input can also be set back to the fault-free state OK resp. FW. To achieve this, in a first step the output is set to the fault-free state OK resp. FW. Hence, we have the forward rules OK AND DF=OK as well as OK AND DFW=FW. In a second step, the backward rules y=OK∧i2=DF→i2=OK and y=OK∧i2=DFW→i2=FW are used to reset the inactive state dependency at input i2.

Input combinations i1=FW AND i2∈{DF,DFW}:

The input combinations FW and DF and FW AND DFW are inadmissible if the AND operator has only two inputs. Since a degraded state at one input does not result in an inactive state at the other input it is not possible that only one input features an inactive state.

Otherwise, if the AND operator has more than two inputs the above input combinations may occur as intermediate combinations. For example, let us consider a three-input AND operator with input states OK, DFW and DF. On the one hand OK AND (DFW AND DF)=OK AND DFW=FW and on the other hand (OK AND DFW) AND DF=FW AND DF which is undefined. In order to make the AND operator associative (independent on the evaluation order of the inputs) we have to require that FW AND DF=FW.

A similar problem appears in the case on an three-input AND operator with input states OK, DFW and DFW. On the one hand OK AND (DFW AND DFW)=OK AND DFW= FW and on the other hand (OK AND DFW) AND DFW=FW AND DFW which is also undefined. In order to make the AND operator associative it is required that FW AND DFW=FW.

Input combinations i1∈{DF,DFW} and i2∈{DF,DFW}:

Both inputs of the AND operator have been set inactive by a preceding backward implication. Before performing the backward implications, the states at the inputs and at the output of the AND operator are as follows:

| output y | input i1 | input i2 |
|---|---|---|
| OK | OK | OK |
| FW | OK | FW |
| FW | FW | OK |
| FW | FW | FW |

As will be shown under "Backward Rules", the backward implication changes state OK to DF and state FW to DFW indicating the inactive state at both the output and inputs. Consequently, after performing the backward implications, the states at the inputs and at the output of the AND operator are as follows:

| output y | input i1 | input i2 |
|---|---|---|
| DF | DF | DF |
| DFW | DF | DFW |
| DFW | DFW | DF |
| DFW | DFW | DFW |

To make sure that a subsequent forward implication does not change the state at output y, we demand that DF AND DF=DF, DF AND DFW=DFW, DFW AND DF=DFW, and DFW AND DFW=DFW.

If exactly one input has a transient or permanent fault the output assumes the faulty input state since the functionality can no longer be provided. More formally, we have $y=i1$ if $i1 \in \{FN,FT,FL,FH\}$ and $i1 \in \{OK,FW,DFW,DF\}$ or $y=i2$ if $i2 \in \{FN,FT,FL,FH\}$ and $i1 \in \{OK,FW,DFW,DF\}$.

There is only one exception of the above rule. A physically dependent state FDN or FDH at the input is not propagated to the output. If the input state is FDN the output becomes FN and if the input state is FDH the output becomes FH.

Finally, it should be noted that the other input with state OK or FW assumes an inactive state DF or DFW. The latter is carried out by applying backward rules.

Of course, if both inputs have a transient or permanent fault the output also assumes a faulty state. To determine the output state we resort to the partial order FDN<FN<FT<FL<FDH<FH. In particular, $y=i1$ if $i2=i1 \lor i2<I$ and $y=i2$ if $i1=i2 \lor i1<i2$.

Obviously, the output state is equal to the strongest fault at the inputs. The double marked entries in FIG. 22 depict this selection principle. For example, FN AND FT=FT since FN<FT and FN AND FH=FH since FN<FH.

There is only one exception of the above rule. A physically dependent state FDN or FDH at the inputs is not propagated to the output, i.e., FDN AND FDN=FN, FDN AND FDH=FH, FDH AND FDN=FH, FDH AND FDH=FH.

An OR operator is used if at least one of several inputs is required for the functionality. Consequently, the complete functionality fails only if all inputs fail. Hence, the output of an OR operator has a degraded state as long as at least one input is fault-free. An OR operator may have an arbitrary number of inputs. Since the OR operator is associative we will suppose that it has only two inputs. All results, however, can easily be generalized. The OR operator is used to model the antenna diversity of the receive path of a BTS.

Figures 23, 24:
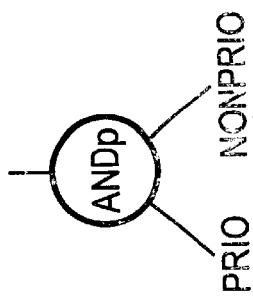
FIG. 23 describes the forward rules of an OR operator.
FIG. 24 describes the inputs of an ANDp operator.

FIG. 23 depicts the truth table of an OR operator. According to FIG. 23 the OR operator is commutative and associative. The neutral state is NV (the only exception is that a physically dependent state is not propagated to the output, i.e., FDN OR NV=FN and FDH OR NV=FH).

If one input is not created, the output assumes the state of the other input. Hence, state NC is also a neutral state. This property is exploited for the simultaneous handling of different HW configurations in a general dependency graph. There is antenna diversity if both inputs are created and there is no diversity if only one input is created.

In order to explain the remaining forward rules associated with an AND operator let us partition the input combinations into three parts:

1) Part I: Both inputs are either fault-free of degraded, i.e., i1={OK,FW,DFW,DF} and i2={OK,FW,DFW,DF}.
2) Part II: One of the inputs is either fault-free or degraded and the other one has either a transient or permanent fault, i.e., i1={OK,FW,DFW,DF} and i2={FDN,FN, FT,FL,FDH,FH} or vice versa.
3) Part III: Both inputs have either a transient or permanent fault, i.e., i1={FDN,FN,FT,FL,FDH,FH} and i2={FDN,FN,FT,FL,FDH,FH}.

The following refer to Forward Rules for Part I.

Part I of the OR operator is similar to part I of the AND operator. The only difference occurs in the input combinations

OK OR DF,

OK OR DFW,

FW OR DF, and FW OR DFW.

Assume that exactly one input of the OR operator has a transient/permanent fault or is not created. In this case, the output is either fault-free or degraded since service can be provided. Hence, the other input has not to assume an inactive state. Generally, there are no inactive state dependency between the inputs of an OR operator.

Consequently, there is no need to reset an inactive state dependency (in contrast to an AND operator).

If there is an inactive input state at one input the output assumes an inactive state, too. Thus, we have

OK OR DF=DF,

OK OR DFW=DFW,

FW OR DF=DFW, and FW OR DFW=DFW.

As will be shown by the backward rules the other input with state OK and FW will immediately assume inactive state DF or DFW.

The following is in regard to Forward Rules for Part II.

If exactly one input has a transient or permanent fault and the other input has state OK or FW the output assumes a degraded state (weak fault FW). The latter indicates that the functionality can still be provided. Note that the other input with state OK or FW does not assume an inactive state DF or DFW.

If exactly one input has a transient or permanent fault and the other input has already an inactive state DF or DFW the inactive state is indicated at the output. Instead of output state FW we have output state DFW.

The following is in regard to Forward Rules for Part III.

Of course, if both inputs have a transient or permanent fault the output also assumes a faulty state. To determine the output state we resort again to the partial order. In particular
y=i2 if i2=i1∨i2<i and
    y=i1 if i1=i2∨i1<i2.

Obviously, the weakest fault is selected. The double marked entries in FIG. 23 depict this selection principle. For example, FN OR FT=FN since FN<FT and FN OR FH=FN since FN<FH.

Again, there is only one exception of the above rule. A physically dependent state FDN or FDH at the inputs is not propagated to the output, i.e., FDN OR FDN=FN, FDN OR FDH=FN, FDH OR FDN=FN, FDH OR FDH=FH.

To model the state dependencies between cascaded RXMUCOs an ANDp operator is used. The ANDP operator has exactly two inputs: a priority input (denoted PRIO, see FIG. 24) and a non-priority input (denoted NONPRIO). The priority input represents the state of the primary RXMUCO and the nonpriority input represents the state of the secondary RXMUCO.

FIG. 25 depicts the truth table of an ANDp operator. The neutral state is NV (the only exception is that a physically dependent state is not propagated to the output, i.e., FDN ANDp NV=NV ANDP FDN=FN and FDH ANDp NV=NV ANDp FDH=FH).

If the non-priority input is not created, the output assumes the state of the priority input. Hence, state NC at the nonpriority input behaves like a neutral state. This property is exploited for the simultaneous handling of different HW configurations in a general dependency graph. There is a cascaded RXMUCO if both inputs are created and there is no cascaded RXMUCO if only the priority input is created.

If the priority input is no created the output has always state NC.

The following are Forward Rules.

The secondary RXMUCO has no influence on the OST and AVS of FMO BTS. Therefore, the state of the priority input determines the state of the output. According to FIG. 25 we have,
    y=i1 for i1∈{OK,FW,DFW,DF,FN,FT,FL,FH}.

If the priority input i1 has state FDN or FDH the output assumes state FN or FH, i.e., the physical dependency is not propagated to the output of the ANDp operator.

To describe physical dependencies between HMOs, a PDEP operator is introduced. There are physical dependencies between a TRXD and a TRXA and between a TRXD and a PA. The PDEP operator has exactly two inputs: the physical dependent input (denoted NONDOM, see FIG. 26 and the input on which the other one depends on (denoted DOM). Note that the TRXA or PA is connected with the NONDOM input and the TRXD with the DOM input.

FIG. 27 depicts the truth table of a PDEP operator. The neutral state is NV.

The following are Forward Rules.

Assume that input ind of the PDEP operator is physically dependent on input id. Depending on the states of id and ind, four cases can be distinguished:

1) id has a transient fault causing a physical dependency and ind is fault-free or has a transient fault, i.e., id∈{FDN,FN} and ind∈{OK,DF,FDN,FN,FT}.
2) id has a transient fault causing a physical dependency and ind has a permanent fault, i.e., id∈{FDN,FN} and ind∈{FL,FDH,FH}.
3) id has a permanent fault causing a physical dependency or is not created and ind is fault-free or has a transient fault, i.e., id∈{FDH,FH,NC} and ind∈{OK,DF,FDN,FN,FT}.
4) id has a permanent fault causing a physical dependency or is not created and ind has a permanent fault, i.e., id∈{FDH,FH,NC} and ind∈{FL,FDH,FH}.

All four cases are marked by double lines in FIG. 27.

The following are Forward Rules for Case 1.

If input id has a transient fault causing a physical dependency and ind is fault-free or has a transient fault, ind has to assume state FDN. This state indicates that ind is physically dependent on id (letter D of state FDN) and the state of ind becomes FN after the transient fault at id is ceased.

To set state FDN at input ind a forward and a backward rule is applied. First, output y is set to state FDN by a forward rule, i.e., the input combinations id∈{FDN,FN} and ind∈{OK,DF,FDN,FN,FT} result in state FDN at y (see double marked lines in FIG. 27). Subsequently, a backward rule is applied to propagate state FDN to ind:

y=FDN∧ind∈{OK,DF,FDN,FN,FT}⇒ind=FDN

Assume that the transient fault at id disappears. Then ind has to assume state FN. To accomplish this, again a forward and a backward rule is used. First, output y is set to state FN by a forward rule. Thus, the input combinations id∈{OK, DF,FT,FL} and ind=FDN result in state FN at y (see bold marked lines in FIG. 27). Subsequently, a backward rule changes state FDN to FN at ind:

y=FN∧ind=FDN⇒ind=FN

The following are Forward Rules for Case 2.

If input id has a transient fault causing a physical dependency and ind has a permanent fault, ind has to assume state FDH. This state indicates that ind is physically dependent on id (letter D of state FDH) and the state of ind becomes FH after the transient fault at id is ceased.

To set state FDH at input ind a forward and a backward rule is applied. First, output y is set to state FDH by a forward rule, i.e., the input combinations id∈{FDN,FN} and ind∈{FL,FDH,FH} result in state FDH at y (see double marked lines in FIG. 27). Subsequently, a backward rule is applied to propagate state FDH to ind:

y=FDH∧ind∈{FL,FDH,FH}⇒ind=FDH

Assume that the transient fault at id disappears. Then, ind has to assume state FH. To accomplish this, again a forward and a backward rule is used. First, output y is set to state FH by a forward rule. Thus, the input combinations id∈{OK, DF,FT,FL} and ind EFDH result in state FH at y (see bold marked lines in FIG. 27). Subsequently, a backward rule changes state FDH to FH at ind:

y=FH∧ind=FDH⇒ind=FH

The following are Forward Rules for Case 3.

If input id has a permanent fault causing a physical dependency or is not created and ind is fault-free or has a transient fault, ind has to assume state FDN. This state indicates that ind is physically dependent on id (letter D of state FDN) and the state of ind becomes FN after the permanent fault at id is ceased or id is created.

To set state FDN at input ind a forward and a backward rule is applied. First, output y is set to state FDH by a forward rule. Note that the state at y becomes FDH instead of FDN because of the permanent fault at id. Consequently, the input combinations id∈{FDH,FH,NC} and ind∈{OK,DF, FDN,FN, FT} give state FDH at y (see double marked lines in FIG. 27). Subsequently, a backward rule is applied to propagate state FDN to ind:

y=FDH∧ind∈{FDN,FN,FT}⇒ind=FDN

Assume that the permanent fault at id disappears or id becomes created. Then, ind has to assume state FN. To accomplish this, again a forward and a backward rule is used. First, output y is set to state FN by a forward rule. Thus, the input combinations id∈{OK,DF,FT,FL} and ind=FDN result in state FN at y (see bold marked lines in FIG. 27).

Subsequently, a backward rule changes state FDN to FN at ind:

y=FN∧ind=FDN⇒ind=FN

The following are Forward Rules for Case 4.

If input id has a permanent fault causing a physical dependency or ind is not created and ind has a permanent fault, ind has to assume state FDH. This state indicates that it is physically dependent on id (letter D of state FDH) and the state of ind becomes FH after the permanent fault at id is ceased or id is created.

To set state FDH at input ind a forward and a backward rule is applied. First, output y is set to state FDH by a forward rule. Thus, the input combinations id∈{FDH,FH, NC} and ind∈{FL,FDH,FH} give state FDH at y (see double marked lines in FIG. 27). Subsequently, a backward rule is applied to propagate state FDH to ind:

y=FDH∧ind∈{FL,FDH,FH}⇒ind=FDH

Assume that the permanent fault at id disappears or id becomes created. Then, ind has to assume state FH. To accomplish this, again a forward and a backward rule is used. First, output y is set to state FH by a forward rule. Thus, the input combinations id∈{OK,DF,FT,FL} and ind∈FDH result in state FH at y (see bold marked lines in FIG. 27). Subsequently, a backward rule changes state FDH to FH at ind:

y=FH∧ind=FDH⇒ind=FH

The EXTF operator is used to model the state dependencies between the HMOs of the BTSM and FMO BTS and the HMOs of a BTS and FMO TRX.

Figures 28, 29:
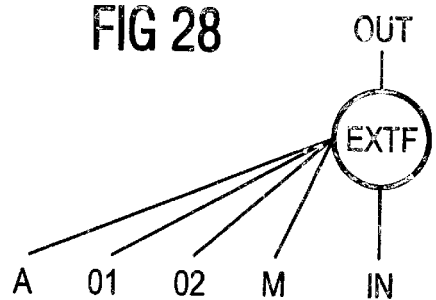
FIG. 28 describes the inputs of an EXTF operator.
FIG. 29 describes the input assignment of the EXTF operator.
Figure 32:
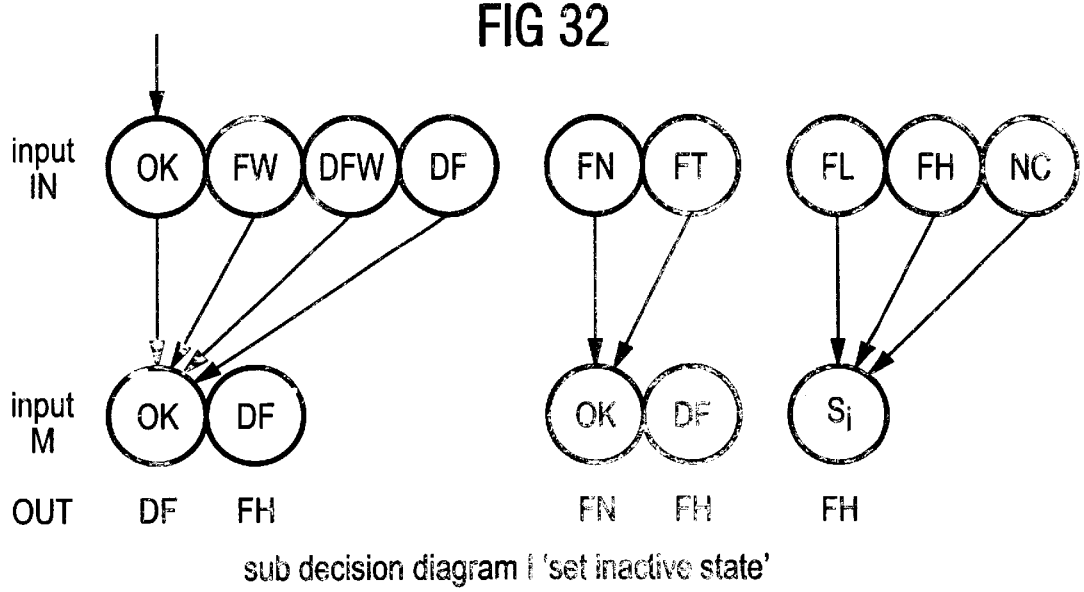
Figure 33:
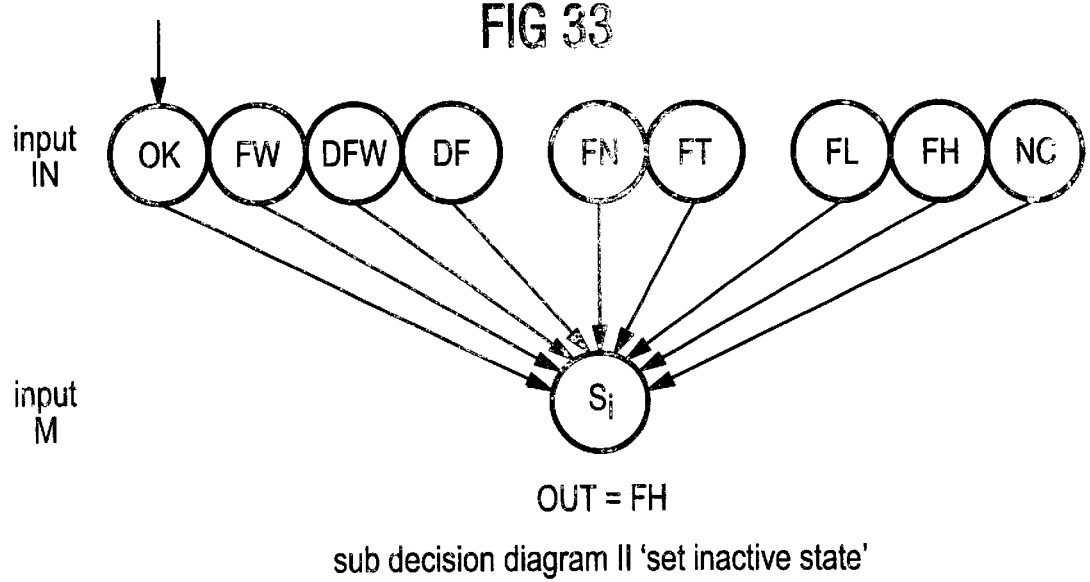
Figure 34:
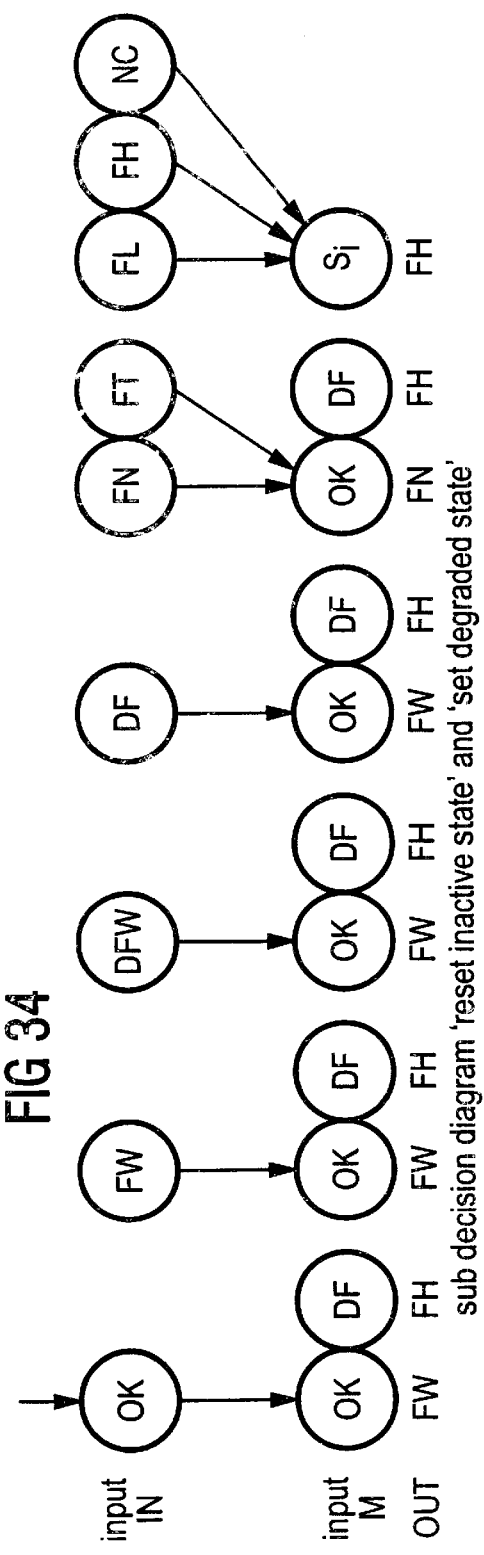
Figure 35:
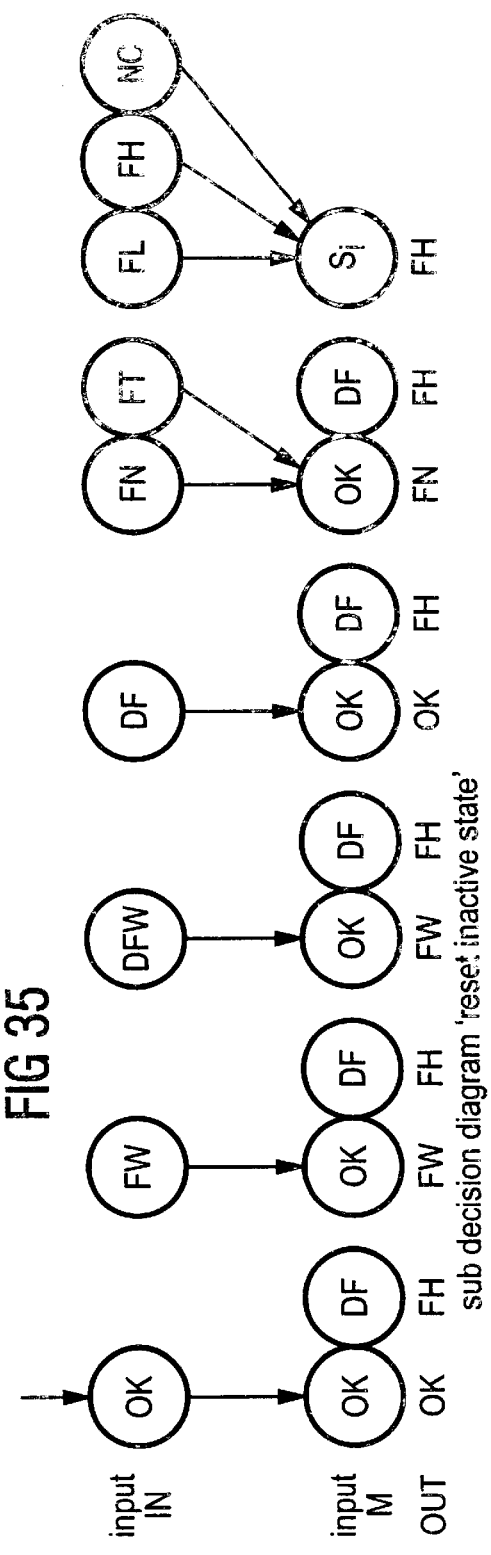

FIG. 28 shows the inputs of an EXTF operator. The inputs are denoted by A (AND input), 01 (Or 1 input), 02 (Or 2 input), M (Mapping input), and IN. The assignment of the inputs to MOs of the dependency graph is given in FIG. 29. The assignment depends on whether the EXTF operator models 1) the state dependencies between FMO BTS and the HMOs of the BTSM or 2)FMO TRX and the HMOs of a BTS. The first (second) row of FIG. 29 shows the assignment in the first (second) case.

As the EXTF operator has 5 inputs, the forward rules cannot by represented by a truth table. For a more appropriate representation we will use a multi-valued decision diagram. First of all, however, the set of all internal states is partitioned into a fault-free set G and a faulty set F:

The set of internal fault-free states is denoted G={OK, FW}; and

The set of internal faulty states is denoted F={DFW,DF, FDN,FN,FT,FL,FDH,FH}.

FIGS. 31–35 show the multi-valued decision diagram of an EXTF operator. The nodes of the diagram are arranged in five levels. Nodes of level 1 represent input A, nodes of level 2 represent input 01, nodes of level 3 represent input 02, nodes of level 4 represent input IN, and nodes of level 5 represent input M. Each node is labeled with an internal state or a set of internal states (e.g. states F and G). The associated state of an arbitrary node n is denoted by s(n). There are edges between the nodes at level I and I+1, 1<i≦4. Each path from a node at level 1 to a node at level 5 represents an input state combination or a set of input state combinations. Assume that P=(n1,n2,n3,n4,n5) is an arbitrary path from top level node n1 to bottom level node n5. Then, all input state combinations s(n1)xs(n2)xs(n3)xs(n4)xs(n5) result in the same output state given at the bottom level node n5.

To explain the decision process, assume that i1 , i2, i3, i4, and i5 are the internal states of inputs A, 01, 02, IN, and M, respectively. To get the output state OUT depending on the input states i1–i5, the following steps are performed:

1) let DD be the complete decision diagram
2) 1=1/*level counter*/
3) if 1=5 goto 8)/*last input processed*/
4) find node n at the top level of DD where input state i2 is included in state i2∈s(n) that is associated with node n, i.e., where
5) let DD be the sub decision diagram at which the edge of n is pointing to
6) 1=1+1/*increase level counter*/
7) goto 3)/*process net input*/
8) the output state is given by the OUT state of the corresponding terminal node.

To illustrate the algorithm consider an example. Assume that i1=OK, i2=FH, i3=OK, i4=OK, and i5=OK. Since i1=OK is included in state G, the last node with label G is selected at level 1 (see step 4). Since i2=FH is included in state F, the first node with label F of the corresponding sub decision diagram is selected at level 2. Since i3=OK is included in G, the third node of the corresponding sub decision diagram is selected at level 3. Next the sub decision diagram 'reset inactive state' and 'set degraded state' is selected (see FIG. 31). Subsequently, the first node at level 4 and the first node at level 5 is selected. The resulting output state is FW indicating a degraded state of the corresponding OMO (see FIG. 33).

To decide whether the state of an input I is included in the associated state s(n) of a node n of the decision diagram, an intersection table is used (see FIG. 30). We get I INT s(n)=I if state I is included in s(n) and I INT s(n)=empty state if I is not included in s(n).

As already shown above, backward rules are used to set and reset the inactive state of HMOs as well as to set and reset physical dependent states of HMOs.

Figure 36:
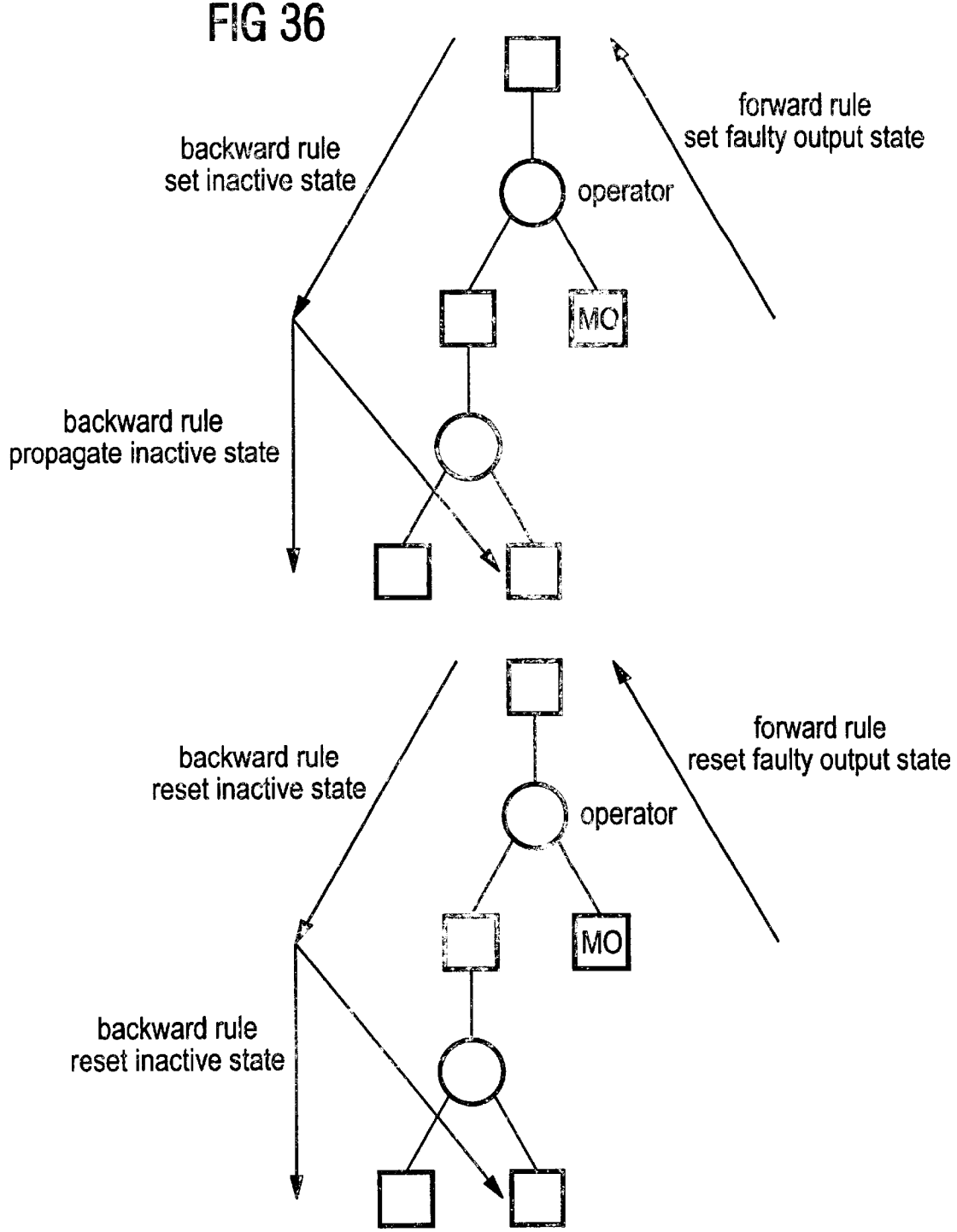
FIG. 36 describes the illustration of backward rules.

The backward rules associated with an AND, OR, ANDp, and EXTF operator can be split into three groups: 1) set inactive state DF or DFW, 2) propagate inactive state DF or DFW, and 3) reset inactive state DF or DFW. The rules are illustrated in FIG. 36.

1) Set inactive state: As shown above, the following two backward rules are used to set the inactive state DF or DFW at an input I of an operator if its output y has the internal state FDN, FN, FT, FL, FDH, FH or NC.

I) y∈{FDN,FN,FT,FL,FDH,FH,NC}∧I=OK⇒I=DF
ii) y∈{FDN,FN,FT,FL,FDH,FH,NC}∧I=FW⇒I=DFW

2) Propagate inactive state: To propagate the inactive state DF or DFW from the output y of an operator to its input I the following three backward rules are used.

I) y=DF∧I=OK⇒I=DF
ii) y=DFW∧I=FW⇒I=DFW
iii) y=DFW∧I=OK⇒I=DF

3) Reset inactive state: The following three backward rules are applied to reset the inactive state DF or DFW at the inputs I of an operator if its output y has the fault-free state OK or the degraded state FW.

I) y=OK∧I=DF⇒I=OK
ii) y=FW∧I=DFW⇒I=FW
iii) y=FW∧I=DF⇒I=OK

The eight backward rules above are represented in FIG. 37. Output y is given in the first column and input I in the first row. The bold marked entries indicate those state combinations in which input I gets a new state. In all other situations the state of I remains unchanged.

The special backward rules of a PDEP operator are given by:

1) Propagate inactive state: To propagate the inactive state DF from the output y of a PDEP operator to its non-dominant input ind the backward rule below is used.

I) Y=DFA ind=OK⇒ind=DF

2) Reset inactive state: The following backward rule is applied to reset the inactive state DF at the non-dominant input ind of a PDEP operator if its output y has the fault-free state OK.

I) y=OK∧ind=DF⇒ind=OK

3) Set transient physical dependent state: The two rules below are used to set the physical dependent state FDN at the non-dominant input ind of a PDEP operator if its output y has state FDN or FDH and ind is fault-free or has a transient fault.

I y=FDN∧ind∈OK,DF,FDN,FN,FT}⇒ind=FDN
ii) y=FDH∧ind∈{OK,DF,FDN,FN,FT}⇒ind=FDN

4) Set permanent physical dependent state: The rule below is used to set the physical dependent state FDH at the non-dominant input ind of a PDEP operator if its output y has state FDH and ind has a permanent fault.

I) y=FDH∧ind∈{FL,FDH,FH}⇒ind=FDH

5) Reset transient physical dependent state: To reset the physical dependent state FDN at the non-dominant input ind of a PDEP operator if its output y has state FN the following rule is applied:

I) y=FN∧ind=FDN⇒ind=FN

6) Reset permanent physical dependent state: To reset the physical dependent state FDH at the non-dominant input ind of a PDEP operator if its output y has state FH the following rule is applied:

I) y=FH∧ind=FDH⇒ind=FH

The backward rules of a PDEP operator are shown in FIG. 38. Output y is given in the first column and non-dominant input ind in the first row. The bold marked entries indicate those state combinations in which the non-dominant input o gets a new state. In all other situations the state of ind remains unchanged.

If a single HMO or generally a set of HMOs (called target HMOs) assumes new states, a state propagation algorithm is used to determine the new states of HMOs and FMOs that depend on the state changes of the target HMOs. The HMOs and FMOs that depend on the states of target HMOs are denoted dependent MOs in the following. The state changes of the target HMOs and dependent MOs are communicated to the operation and maintenance center OMC.

Figure 39:
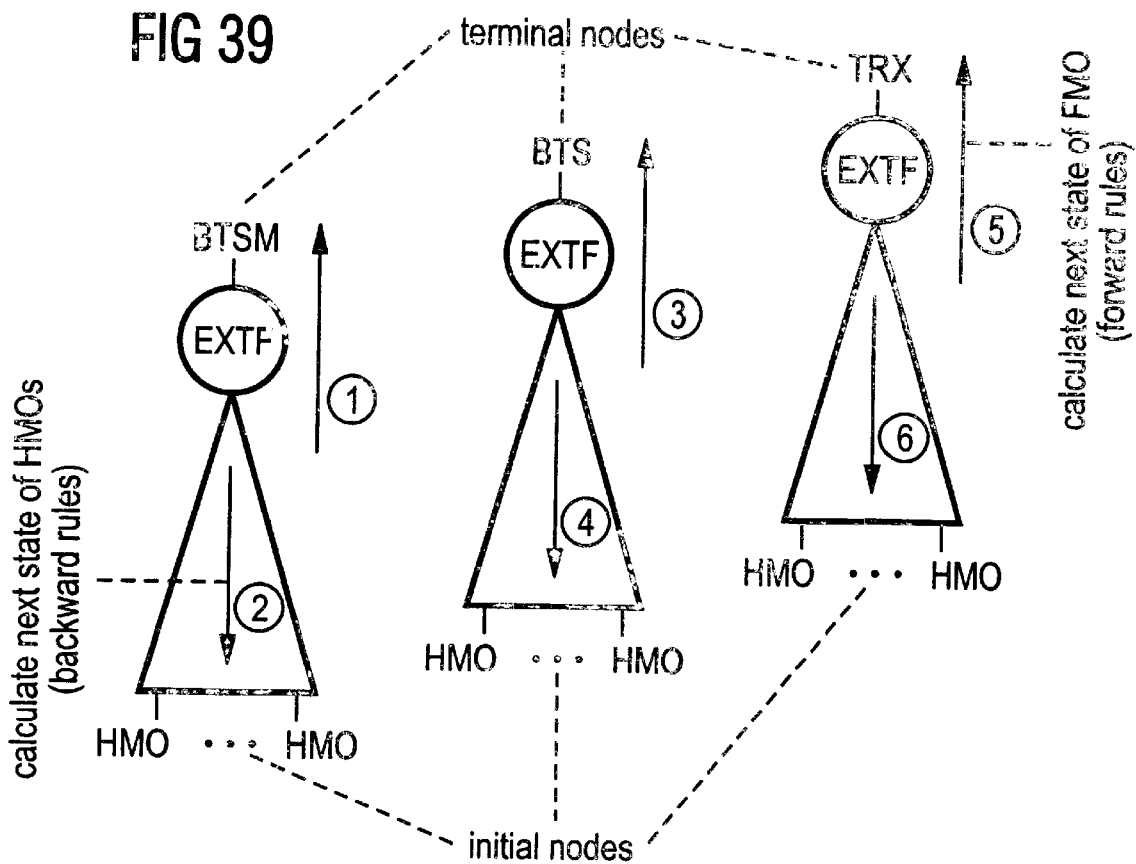
FIG. 39 describes forward and backward propagation.

The state propagation algorithm consists of a forward and backward propagation procedure (see FIG. 39).

The forward propagation is used to determine the next state of the FMOs BTSM, BTS, and TRX. The forward propagation starts from the initial nodes (HMOs) of the dependency graph.

In a levelized order from lower to higher levels the forward rules (also called forward implications) of the operators are applied. The forward implications are stopped at FMOs since these are terminal nodes having no successors.

Afterwards the backward propagation starts from the terminal nodes of the dependency graph. In a levelized order from higher to lower levels the backward rules (also called backward implications) of the operators are applied. The backward implications are stopped at HMOs since these are initial nodes having no predecessors.

Figure 40:
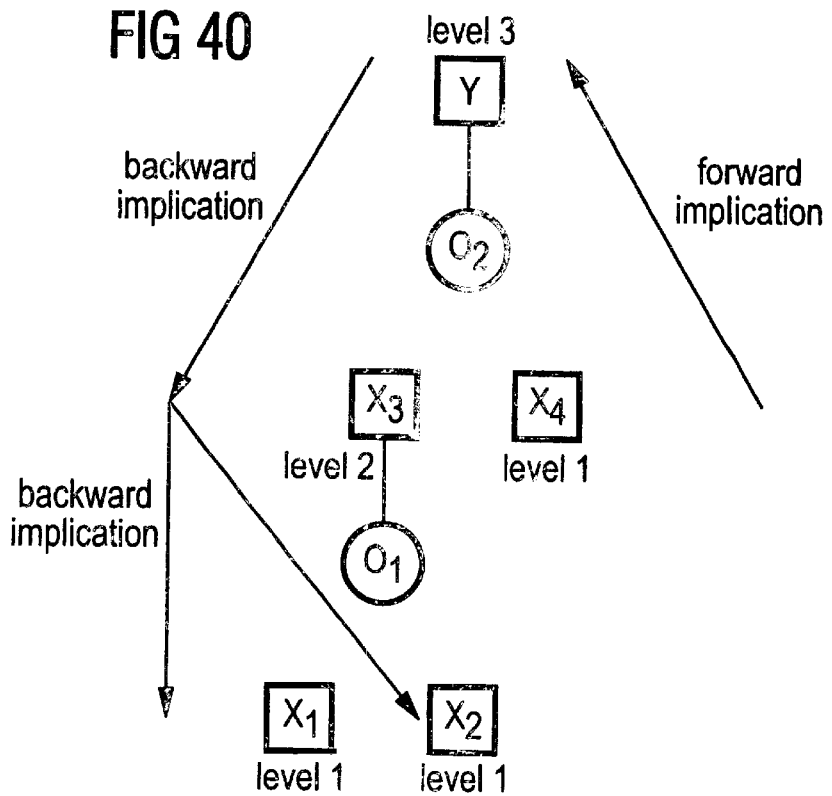
FIG. 40 describes an example of the dependency graph and implications.

To explain the algorithm let us consider the small example dependency graph of FIG. 40. Let us assume that target HMO $x_4$ gets a new state. First, a forward implication of operation $O_2$ is applied to get the new state of output MO y. Since y is a terminal node the forward propagation is stopped. Subsequently, the new state of $x_3$ is determined using a backward implication of operator $O_1$. Finally, the new states of $x_1$ and $x_2$ are calculated using a backward implication of operator $O_1$.

More formally, the state propagation algorithm is depicted in FIGS. 41–43. As already mentioned, all MOs get a bottom up level. The latter means that initial nodes have level 1 and the level of an arbitrary intermediate node is the maximum level of its predecessor nodes plus 1 (see FIG. 40).

To separately manage the forward and backward implications, two sets are introduced. Set $S_F$ and $S_B$ consist of all forward and backward implications that have to be performed in the dependency graph, respectively. Set $S_F$ initially includes all target HMOs and set $S_B$ is initially empty. Both sets are dynamically changed during the forward and backward implication steps (see FIGS. 42–43). If both sets $S_F$ and $S_B$ are empty, all dependent MOs get a new state and the propagation is stopped.

In a first step, forward implications are performed at all target HMOs since these MOs get a new state. As shown in FIG. 42, all operators op that are fed by a target HMO are determined. Next, the next state $S_{new}(y)$ of the output MO y of op is calculated by performing a forward implication. The forward implication $op_{for}(S_{old}(i_1), \ldots, S_{old}(i_n))$ gives the new state of y according to operator specific a truth table or a general decision diagram, where $S_{old}(i_1), \ldots, S_{old}(i_n)$ denotes the old states of the input MOs $i_1, \ldots, i_n$ of the operator op, respectively. If old and new state of output MO y differ, the new state is assigned to y and y is put into set $S_F$ if y is no terminal node. In addition, y is also put into set $S_B$ to perform in any case a backward implication. Since the MOs are selected from $S_F$ according to an increasing level (see FIG. 41) forward implications are from lowest to highest levels. The procedure is stopped if set $S_F$ becomes empty.

In a second step, backward implications are performed if $S_B$ is nonempty after performing the forward implication step (see FIG. 41). The MO o with highest level is selected from $S_B$. As shown in FIG. 43, the unique operator op which has o as output is determined. Next, a set I of input Mos of op is selected. The set I depends on the operator type. Subsequently, it is checked whether the input MOs of set I assume a new state. The new state $S_{new}(I)$ of each input I of I is calculated by performing backward implications. The backward implication $op_{back}(S_{old}(O), S_{old}(I))$ gives the new state of I according to a operator specific truth table, where $S_{old}(O)$ and $S_{old}(I)$ denote the old state of output MO o and input MO I, respectively. If old and new state of input MO I differ, the new state is assigned to I and I is put into set $S_B$ if I is no initial node. In addition, I is also put into set $S_F$ if I feeds more than one operator. The latter results in additional forward implications. Since the MOs are selected from $S_B$ according to a decreasing level (see FIG. 41) backward implications are performed from highest to lowest levels. The procedure is stopped if set $S_B$ becomes empty.

According to the forward propagation algorithm, each forward implication may result in additional forward implications and in any case in a backward implication. According to the backward implication algorithm, a backward implication may result in additional backward implications, but does not result in a forward implication. The only exception is an input that feeds more than one operator.

Let us suppose that there is a consistent state assignment between y, $i_1$, and $i_2$, i.e., $S_{old}(y)=op_{for}(S_{old}(i_1), S_{old}(i_2))$, where $op_{for}(S_{old}(i_1), S_{old}(i_2))$ is the state according to the truth table of operator $O_1$. Let us further assume that $i_1$ and $i_2$ get a new state by performing backward implication.

$$S_{new}(i_1)=op_{back}(S_{old}(Y), S_{old}(i_1)) \text{ and } S_{new}(i_2)=op_{back}(S_{old}(Y), S_{old}(i_2)),$$

respectively. Then, there will be additional backward implications at i and $i_2$. Furthermore, there will be a forward implication from $i_2$ to z, since $i_2$ additionally feeds operator $o_2$. However, there will be no forward implications from i1 and $i_2$ back to y. The latter came from the following property called state consistency law I:

$$S_{sold}(Y)=op_{for}(S_{old}(i_1), S_{old}(i_2))=op_{for}(op_{back}(S_{old}(Y), S_{old}(i_1)), op_{back}(S_{old}(Y), S_{old}(i_2))) \quad (1)$$

In other words, a backward implication which starts from a consistent state assignment does not require an additional forward implication, since the state of y does not change, even if the inputs $i_1$ and $i_2$ assume a new state. Property (1) can be generalized to more than two inputs and holds for each operator type.

Each further backward implication preserves the state consistency. Assume a consistent state assignment between y, $i_1$, and $i_2$, i.e., $S_{old}(y)=op_{for}(S_{old}(i_1), S_{old}(i_2))$. Let $S_{new}(y)$, $S_{new}(i_1)=op_{back}(S_{new}(Y), S_{old}(i_1))$, and $S_{new}(i_2)=op_{back}(S_{new}(Y), S_{old}(i_2))$ be assigned to y, $i_1$, and $i_2$ by performing backward implications, respectively. Then, the following property called state consistency law II holds $$S_{new}(Y)=op_{for}(op_{back}(S_{new}(Y), S_{old}(i_1)), op_{back}(S_{new}(Y), S_{old}(i_2))) \quad (2)$$

In other words, the consistent old state assignment becomes a consistent new state assignment by performing backward implications. Property (2) can be generalized to more than two inputs and holds for each operator type.

With state consistency laws I and II the state propagation terminates, i.e., sets $S_F$ and $S_B$ become empty after a final number of implication steps. The algorithm requires only a minimal number of implication steps due to the levelized approach. In order to minimize the effort to append and select elements from sets $S_F$ and $S_B$, priority sets are used.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A telecommunication network, comprising:
    a plurality of network elements each of said network elements having hardware objects;
    an operation and maintenance device, of the plurality of network elements communicating at least one network element state changes to the operation and maintenance device;
    the operation and maintenance device having a memory device for separately storing a state dependency graph with objects, states of the objects and operators, and storing a set of rules allocated to the operators; and
    a processing device, which processes the communicated state changes by applying the rules to the operators of the dependency graph and calculating new states of objects that depend on the communicated state change.

2. The telecommunication network according to claim 1, wherein the set of rules allocated to the operators has forward and backward rules.

3. The telecommunication network according to claim 2, wherein the forward rules are applied first to the state dependency graph in bottom up direction and the backward rules in top down direction after applying the forward rules.

4. The telecommunication network according to claim 2, wherein the state dependency graph has hierarchical layers and wherein the forward rules are applied to all hierarchical layers of the state dependency graph before applying the backward rules.

5. The telecommunication network according to claim 2, wherein the state dependency graph has at least one hierarchical layer and wherein the forward rules are applied to the at least one hierarchical layer of the state dependency graph before applying the backward rules to that layer.

6. The telecommunication network according to claim 5, wherein only one state change of one of said objects is communicated from one of said network elements to the operation and maintenance device.

7. The telecommunication network according to claim 6, wherein the objects describe hardware related managed objects and functional managed objects.

8. The telecommunication network according to claim 7, wherein the rules are stored in one of a table or a general decision diagram.

9. The telecommunication network according to claim 8, wherein the state dependency graph contains dummy objects which are replaceable by real objects in case of a reconfiguration of the network element.

10. The telecommunication network according to claim 9, wherein the new state dependency graph is processed by the processing device in order to signal information for one of reconfiguration or recovery of one of said network elements.

11. The telecommunication network according to claim 10, wherein the states of the dependency graph are a reduced representation of a plurality of possible states of said objects.

12. The telecommunication network according to claim 11, wherein the state dependency graph describes the objects of one network element.

13. The telecommunication network according to claim 11, wherein the operation and maintenance device is an operation and maintenance center and wherein the state dependency graph describes the objects of at least two network elements and interdependencies of the at least two network elements.

14. A state propagation method for network elements, said network elements having hardware objects, comprising the steps of:

communicating a state change of at least one of said hardware objects to an operation and maintenance device;

separately storing, in the operation and maintenance device, a state dependency graph with objects, states of the objects and operators, and a set of rules allocated to the operators;

processing the communicated state change in the dependency graph;

applying the rules to the operators of the dependency graph; and calculating new states of objects that depend on the communicated state change.

15. A telecommunication network, comprising:

a plurality of network elements each of said network elements having hardware objects;

an operation and maintenance device, of the plurality of network elements communicating at least one network element state changes to the operation and maintenance device;

the operation and maintenance device having a memory device for separately storing a state dependency graph with objects, states of the objects and operators, and storing a set of rules allocated to the operators, the set of rules allocated to the operators having forward and backward rules;

a processing device, which processes the communicated state changes by applying the rules to the operators of the dependency graph and calculating new states of objects that depend on the communicated state change;

the state dependency graph having at least one hierarchical layer and the forward rules being applied to the at least one hierarchical layer of the state dependency graph before applying the backward rules to that layer; and only one state change of one of said objects being communicated from one of said network elements to the operation and maintenance device.

16. The telecommunication network according to claim 15, wherein the state dependency graph contains dummy objects which can be replaced by real objects in case of a reconfiguration of the network element.

17. The telecommunication network according to claim 16, wherein the new state dependency graph is processed by the processing device in order to signal information for one of reconfiguration or recovery of one of said network elements.

18. The telecommunication network according to claim 17, wherein the states of the dependency graph are a reduced representation of a plurality of possible states of said objects.

19. The telecommunication network according to claim 18, wherein the state dependency graph describes the objects of one network element.

20. The telecommunication network according to claim 18, wherein the operation and maintenance device is an operation and maintenance center and wherein the state dependency graph describes the objects of at least two network elements and interdependencies of the at least two network elements.

* * * * *